(12) United States Patent
Zhang et al.

(10) Patent No.: US 12,034,911 B2
(45) Date of Patent: Jul. 9, 2024

(54) DEFINITION OF ZERO UNIT

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Hsiao Chiang Chuang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/134,082

(22) Filed: Dec. 24, 2020

(65) Prior Publication Data
US 2021/0120233 A1    Apr. 22, 2021

Related U.S. Application Data

(63) Continuation of application No. PCT/IB2019/055562, filed on Jul. 1, 2019.
(Continued)

(30) Foreign Application Priority Data

Jun. 29, 2018  (WO) ............... PCT/CN2018/093631

(51) Int. Cl.
*H04N 19/105*    (2014.01)
*H04N 19/119*    (2014.01)
(Continued)

(52) U.S. Cl.
CPC ........ *H04N 19/105* (2014.11); *H04N 19/119* (2014.11); *H04N 19/159* (2014.11); *H04N 19/176* (2014.11); *H04N 19/96* (2014.11)

(58) Field of Classification Search
None
See application file for complete search history.

(56) References Cited

U.S. PATENT DOCUMENTS 11,122,296 B2 *   9/2021  Leleannec ............ H04N 19/122
2003/0081850 A1 *  5/2003  Karczewicz .......... H04N 19/61
                                              375/E7.161
(Continued)

FOREIGN PATENT DOCUMENTS

CA    3019490 A1    11/2017
CN    101449476 A    6/2009
(Continued)

OTHER PUBLICATIONS

Ma et al. "Description of Core Experiment 1 (CE1): Partitioning," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J1021, 2018.
(Continued)

*Primary Examiner* — Talha M Nawaz
(74) *Attorney, Agent, or Firm* — Perkins Coie LLP

(57) ABSTRACT

Devices, systems and methods for using zero-units in video and image coding are described. In a representative aspect, a method for processing video, including: determining, for a conversion between a block of the video and a bitstream of the video, that the block is a zero-unit (ZU) block based on at least one of the dimensions being a non-power-of-two number, wherein no transform and inverse-transform operations are performed on the block; performing the conversion based on the determination.

19 Claims, 22 Drawing Sheets

Related U.S. Application Data

(60) Provisional application No. 62/693,415, filed on Jul. 2, 2018.

(51) Int. Cl.
  H04N 19/159 (2014.01)
  H04N 19/176 (2014.01)
  H04N 19/96 (2014.01)

(56) References Cited

U.S. PATENT DOCUMENTS

| | | | | |
|---|---|---|---|---|
| 2012/0230411 A1* | 9/2012 | Liu | ............ | H04N 19/70 375/E7.125 |
| 2013/0114730 A1* | 5/2013 | Joshi | ............ | H04N 19/156 375/240.18 |
| 2013/0294524 A1* | 11/2013 | Van Der Auwera | ... | H04N 19/60 375/240.18 |
| 2014/0046670 A1* | 2/2014 | Moon | ............ | G10L 19/022 704/500 |
| 2014/0192862 A1* | 7/2014 | Flynn | ............ | H04N 19/117 375/240.03 |
| 2015/0016506 A1* | 1/2015 | Fu | ............ | H04N 19/174 375/240.02 |
| 2015/0078443 A1* | 3/2015 | Kolesnikov | ............ | H04N 19/60 375/240.18 |
| 2015/0249828 A1* | 9/2015 | Rosewarne | ............ | H04N 19/136 375/240.02 |
| 2018/0084284 A1* | 3/2018 | Rosewarne | ............ | H04N 19/124 |
| 2018/0109812 A1* | 4/2018 | Tsai | ............ | H04N 19/157 |
| 2018/0278958 A1* | 9/2018 | Hsiang | ............ | H04N 19/60 |
| 2019/0215516 A1* | 7/2019 | Lim | ............ | H04N 19/122 |
| 2019/0349602 A1* | 11/2019 | Li | ............ | H04N 19/60 |
| 2020/0007893 A1* | 1/2020 | Leleannec | ............ | H04N 19/157 |
| 2020/0029072 A1* | 1/2020 | Xu | ............ | H04N 19/105 |
| 2020/0304816 A1* | 9/2020 | Zhao | ............ | H04N 19/184 |
| 2021/0037237 A1* | 2/2021 | Hsiang | ............ | H04N 19/70 |
| 2021/0084319 A1* | 3/2021 | Zhao | ............ | H04N 19/119 |
| 2021/0321130 A1* | 10/2021 | Li | ............ | H04N 19/46 |

FOREIGN PATENT DOCUMENTS

| | | |
|---|---|---|
| CN | 103718556 A | 4/2014 |
| CN | 104202599 A | 12/2014 |
| CN | 104685872 A | 6/2015 |
| CN | 105103549 A | 11/2015 |
| CN | 103004192 B | 5/2016 |
| CN | 105721867 A | 6/2016 |
| CN | 107211154 A | 9/2017 |
| CN | 107925773 A | 4/2018 |
| CN | 108134935 A | 6/2018 |
| CN | 108174211 A | 6/2018 |
| EP | 3310054 A1 | 4/2018 |
| TW | 201820882 A | 6/2018 |
| WO | 2012005521 A2 | 1/2012 |
| WO | 2018088805 A1 | 5/2018 |

OTHER PUBLICATIONS

Chen et al. "Algorithm Description of Joint Exploration Test Model 7 (JEM 7)," Joint Video Exploration Team (JVET) of itu-t sg 16 WP 3 and ISO/IEC JTC 1/SC 29/WG 11, 7th Meeting: Torino, IT, Jul. 13-21, 2017, document JVET-G1001, 2017.

Escoda et al. "Geometry-Adaptive Block Partitioning for Video Coding," IEEE, ICASSP, 2007, pp. 657-660.

JEM-7.0: https://jvet.hhi.fraunhofer.de/svn/svn_HMJEMSoftware/tags/ HM-16.6-JEM-7.0.

H.265/HEVC, https://www.itu.int/rec/T-REC-H.265.

Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.

Rosewarne et al. "CE1: Test 3—Square Transforms for Range Extensions," Joint Collaborative Team on Video Coding (JCT-VC) of ITU-T SG 16 WP 3 and ISO/IEC JTC 1/SC 29/WG 11, 12th Meeting, Geneva, CH, Jan. 16-23, 2013, document JCTVC-L0148, 2013.

Sullivan et al. "Overview of the High Efficiency Video Coding (HEVC) Standard," IEEE Transactions on Circuits and Systems for Video Technology, Dec. 2012, 22(12):1649-1668.

Won et al. "Transform Skip Based on Minimum TU Size," Joint Collaborative Team on Video Coding (JCT-VC) of ITU SG 16 WP 3 and ISO/IEC JTC 1/SC 29/WG 11, 14th Meeting, Vienna, AT, Jul. 25 to Aug. 2, 2013, document JCTVC-N0167, 2013.

Xiu et al. "Rext HLS: On Lossless Coding," Joint Collaborative Team on Video Coding (JCT-VC) of ITU-T SG 16 WP 3 and ISO/IEC JTC 1/SC 29/WG 11, 17th Meeting: Valencia, ES, Mar. 27 to Apr. 4, 2014, document JCTVC-Q0106, 2014.

Zhang et al. "CE1-Related: Zero-Unit for Picture Boundary Handling," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0320, 2018.

International Search Report and Written Opinion from PCT/IB2019/055433 dated Nov. 15, 2019 (14 pages).

International Search Report and Written Opinion from PCT/IB2019/055553 dated Jan. 8, 2020 (18 pages).

International Search Report and Written Opinion from PCT/IB2019/055562 dated Jan. 8, 2020 (20 pages).

* cited by examiner

750

752 — making a determination, for a block of video data having at least a height or a width that is a non-power-of-two number of pixels, to decode the block of video data from a bitstream representation without a transform operation 754 — performing an in-loop filtering on a result of the decoding, wherein a type of the in-loop filter is selected based on the determination

FIG. 7B

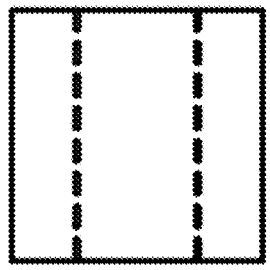
FIG. 10A
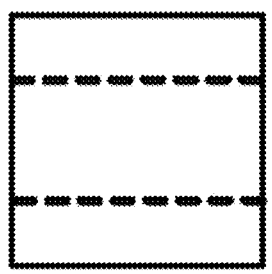
FIG. 10B
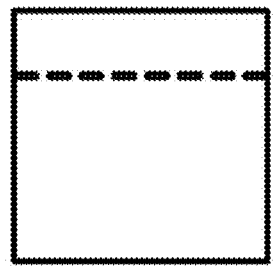
FIG. 10F
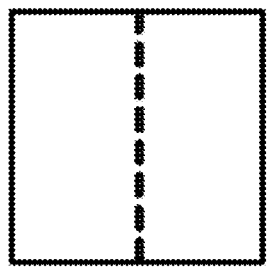
FIG. 10C
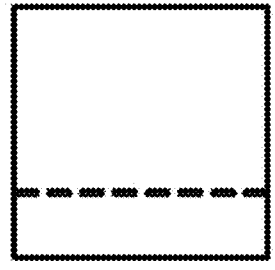
FIG. 10G
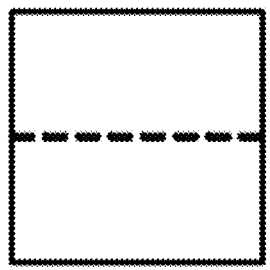
FIG. 10D
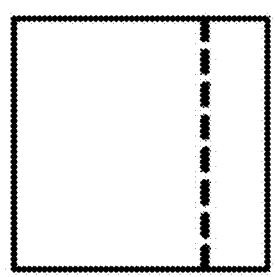
FIG. 10H
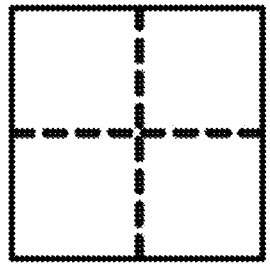
FIG. 10E
FIG. 10I

DEFINITION OF ZERO UNIT

CROSS REFERENCE TO RELATED APPLICATIONS

This application is a continuation of International Application No. PCT/IB2019/055562, filed on Jul. 1, 2019, which claims the priority to and benefits of International Patent Application No. PCT/CN2018/093631, filed on Jun. 29, 2018, and U.S. Provisional Patent Application No. 62/693, 415, filed on Jul. 2, 2018. All the aforesaid patent applications are hereby incorporated by reference in their entireties.

TECHNICAL FIELD

This patent document is directed generally to image and video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to a specialized coding unit (CU) and/or coding tree unit (CTU) to increase coding efficiency are described. Specifically, the presently disclosed technology discloses provides the zero-unit that enhances, in an example, the processing of sub-blocks that are located at the borders of a block of video data (e.g., in a picture, slice, tile and the like). The described methods may be applied to both the existing video coding standards (e.g., High Efficiency Video Coding (HEVC)) and future video coding standards or video codecs.

In one example aspect, a method of video processing is disclosed. The method includes determining that a block of video data is a zero-unit (ZU) block based on at least one of the dimensions being a non-power-of-two number, coding, in response to the determining that the block of video data is a ZU block, the ZU block with all residuals set to zero; and signaling the coded ZU block in a bitstream.

In another example aspect, another method of video processing is disclosed. The method includes receiving a bitstream corresponding to a block of video data; determining that the block of video data is coded as a zero-unit (ZU) block with all residuals set to zero due to at least one dimension of the block being a non-power-of-two number; and decoding, based on the determination, the block of video data.

In another example aspect, another method of video processing is disclosed. The method includes determining that a block of video data is a zero unit (ZU) block based on dimensions of the block being a power-of-two numbers; coding, upon deciding that this is a ZU block, the block of video data in a bitstream; and signaling the ZU block in the bitstream.

In another example aspect, another method of video processing is disclosed. The method includes receiving a bitstream corresponding to a block of video data; determining that the block of video data is a zero-unit (ZU) block based on dimensions of the block being power-of-two numbers; and decoding, based on the signaling, the bitstream to reconstruct the block of video data.

In another example aspect, another method of video processing is disclosed. The method includes determining that a block of video data having a width and a height is to be coded as a zero unit (ZU) block based on having a width less than or equal to a first integer and having a height less or equal to a second integer, coding, upon deciding that this is a ZU block, the block of video data as a ZU block; and signaling the ZU block in a bitstream.

In another example aspect, another method of video processing is disclosed. The method includes receiving a bitstream corresponding to a block of video data having a width and a height; determining that the block of video data is to be decoded as a zero unit (ZU) block based on having a width greater than or equal to a first integer and having a height greater than or equal to a second integer; and decoding, based on the signaling, the bitstream to reconstruct the block of video data.

In another example aspect, another method of video processing is disclosed. The method includes determining that a block of video data having a width and a height is to be coded as a zero unit (ZU) block based on having a width greater than or equal to a first integer or having a height greater than or equal to a second integer, coding, upon deciding that this is a ZU block, the block of video data as a ZU block; and signaling the ZU block in a bitstream.

In another example aspect, another method of video processing is disclosed. The method includes receiving a bitstream corresponding to a block of video data having a width and a height; determining that the block of video data is to be decoded as a zero unit (ZU) block based on having a width greater than or equal to a first integer or having a height greater or equal to a second integer; and decoding, based on the signaling, the bitstream to reconstruct the block of video data.

In another example aspect, another method of video processing is disclosed. The method includes determining that a block of video data having a width and a height is to be coded as a zero unit (ZU) block based on having the product of the width and the height greater than or equal to an integer, coding, upon deciding that this is a ZU block, the block of video data as a ZU block; and signaling the ZU block in a bitstream.

In another example aspect, another method of video processing is disclosed. The method includes receiving a bitstream corresponding to a block of video data having a width and a height; determining that the block of video data is to be decoded as a zero unit (ZU) block based on having the product of the width and the height greater than or equal to an integer; and decoding, based on the signaling, the bitstream to reconstruct the block of video data.

In yet another representative aspect, the above-described method is embodied in the form of a computer-readable medium storing processor-executable code for implementing the method.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 7A-7B are flowcharts for video processing method examples.

FIG. 10A-10I shows an example subdivision of a CB based on a QTBT.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Example Embodiments of Video Coding

Figure 1:
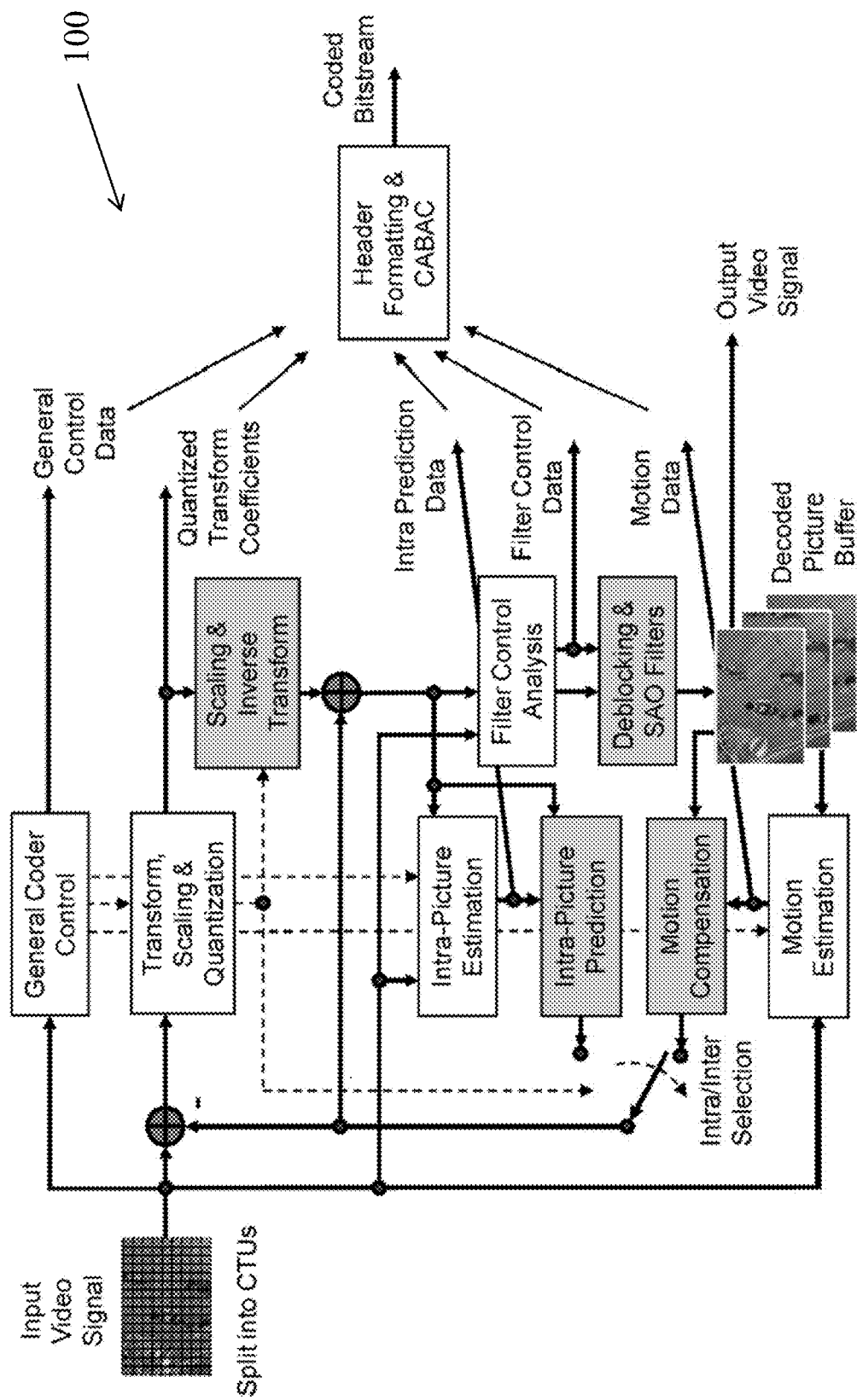
FIG. 1 shows an example block diagram of a typical High Efficiency Video Coding (HEVC) video encoder and decoder.

FIG. 1 shows an example block diagram of a typical HEVC video encoder and decoder. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 1) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (i.e., bitstream order) and the output order (i.e., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

1.1. Examples of Partition Tree Structures in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
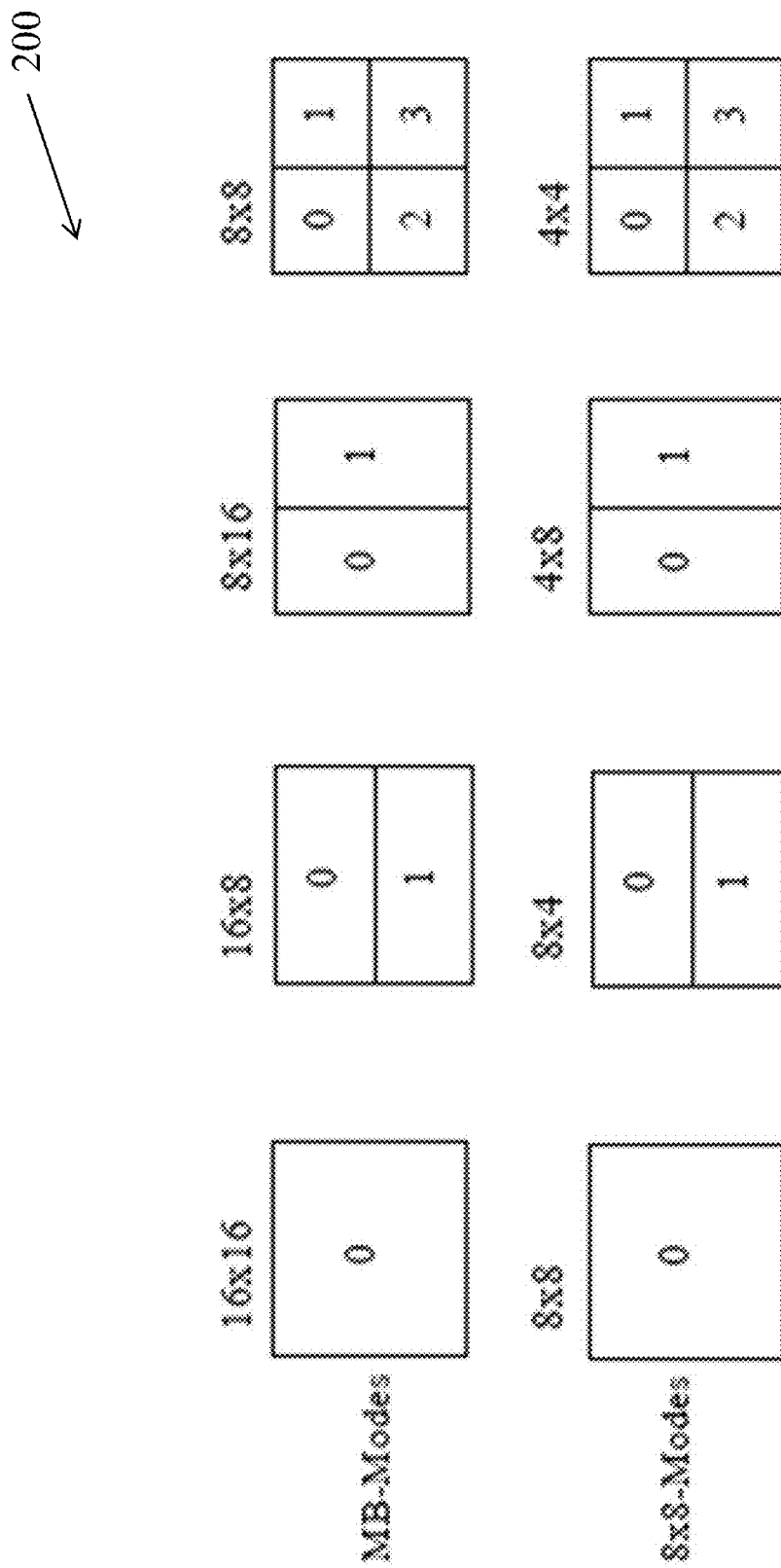
FIG. 2 shows examples of macroblock (MB) partitions in H.264/AVC.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4, as shown in FIG. 2. Only one motion vector (MV) per sub-macroblock partition is allowed.

1.2 Examples of Partition Tree Structures in HEVC

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied, and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

Certain features involved in hybrid video coding using HEVC include:
(1) Coding tree units (CTUs) and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

(2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
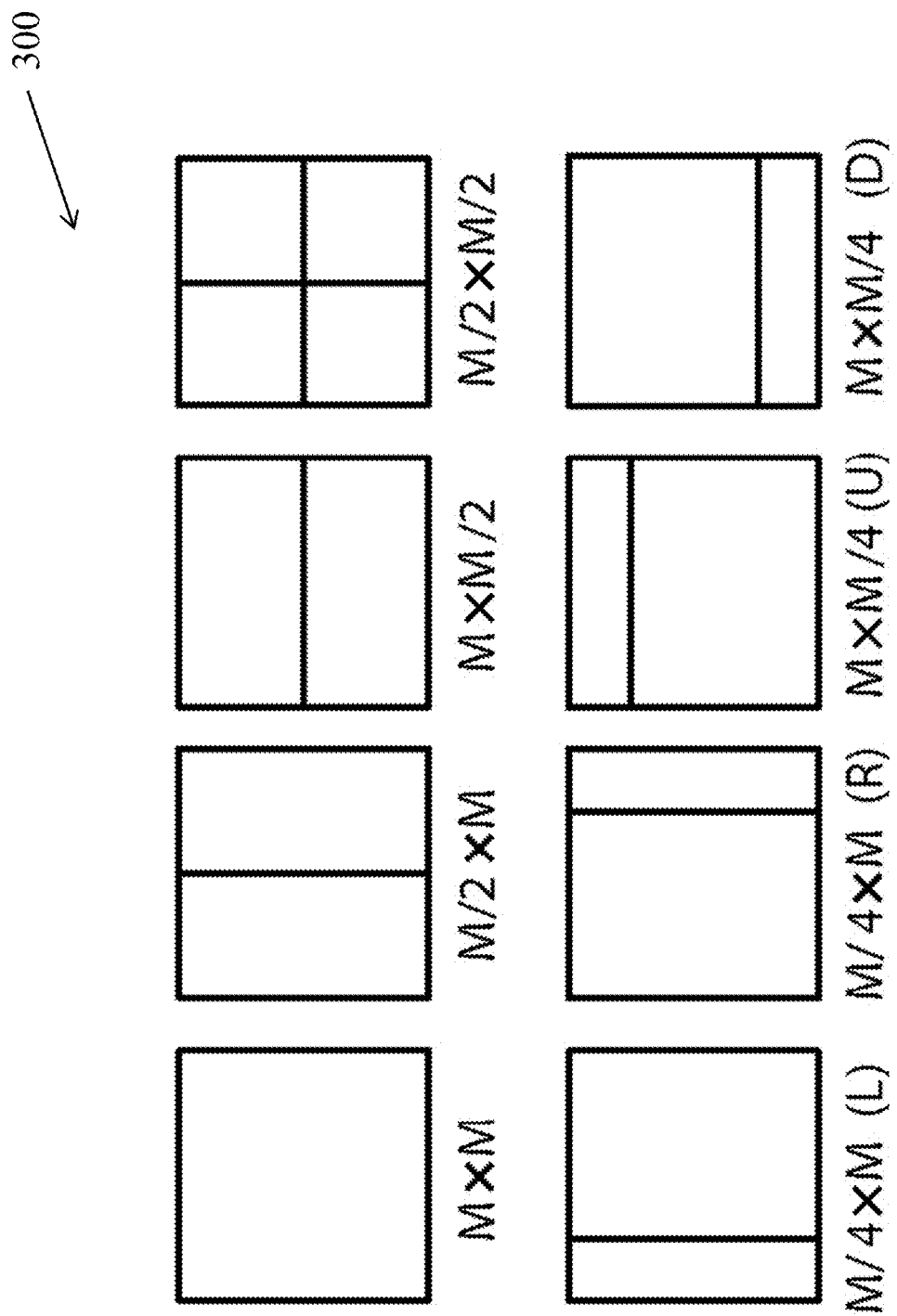
FIG. 3 shows examples of splitting coding blocks (CBs) into prediction blocks (PBs).

(3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for an M×M CU.

(4) Transform units (Tus) and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

1.2.1. Examples of Tree-Structured Partitioning into TBs and TUs

Figure 4A:
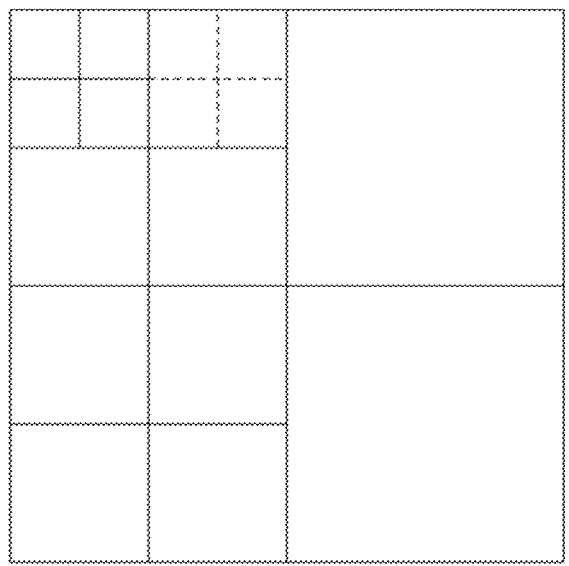
FIGS. 4A and 4B show an example of the subdivision of a coding tree block (CTB) into CBs and transform blocks (TBs), and the corresponding quadtree, respectively.
Figure 4B:
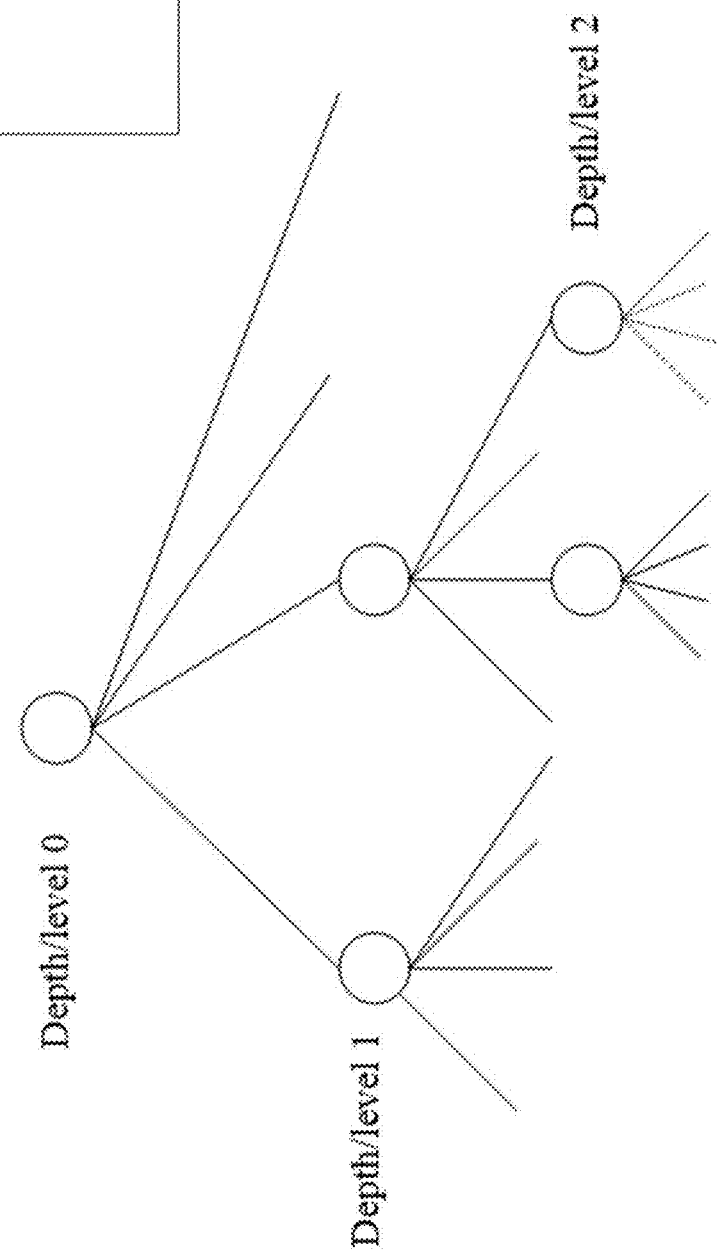

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4A-4B. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

1.2.2. Examples of Picture Border Coating

The borders of the picture are defined in units of the minimally allowed luma CB size. As a result, at the right and bottom borders of the picture, some CTUs may cover regions that are partly outside the borders of the picture. This condition is detected by the decoder, and the CTU quadtree is implicitly split as necessary to reduce the CB size to the point where the entire CB will fit into the picture.

Figure 5:
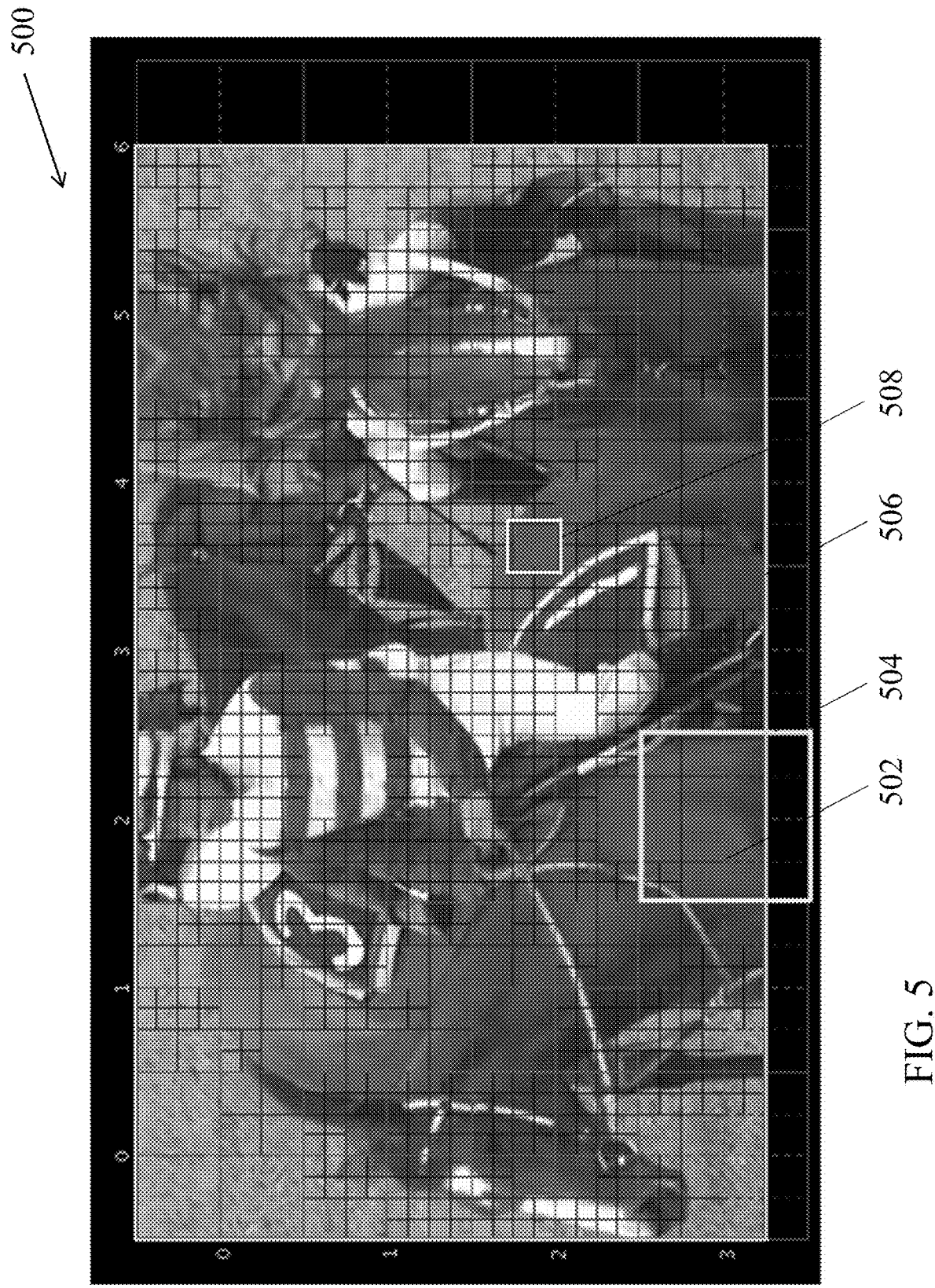
FIG. 5 shows an example of a partition structure of one frame.

FIG. 5 shows an example of a partition structure of one frame, with a resolution of 416×240 pixels and dimensions 7 CTBs×4 CTBs, wherein the size of a CTB is 64×64. As shown in FIG. 5, the CTBs that are partially outside the right and bottom border have implied splits (dashed lines, indicated as 502), and the CUs that fall outside completely are simply skipped (not coded).

Figure 6A:
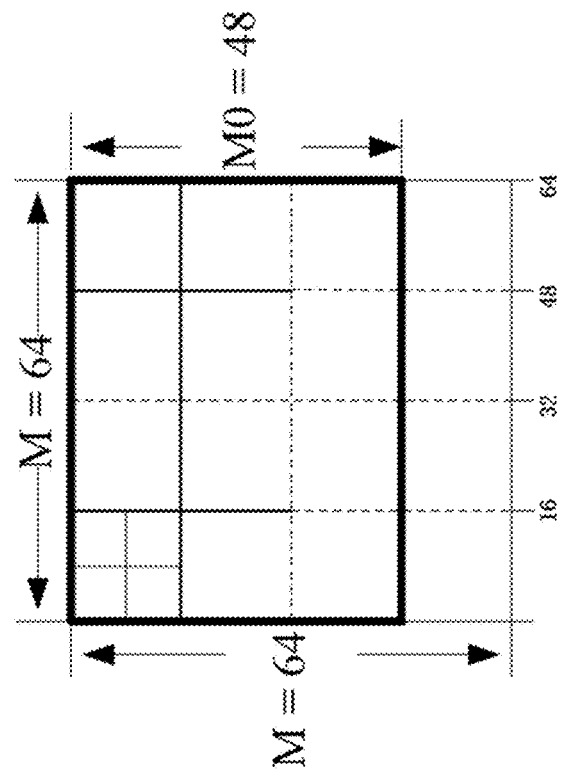
FIGS. 6A and 6B show the subdivisions and signaling methods, respectively, of a CTB highlighted in the exemplary frame in FIG. 5.
Figure 6B:
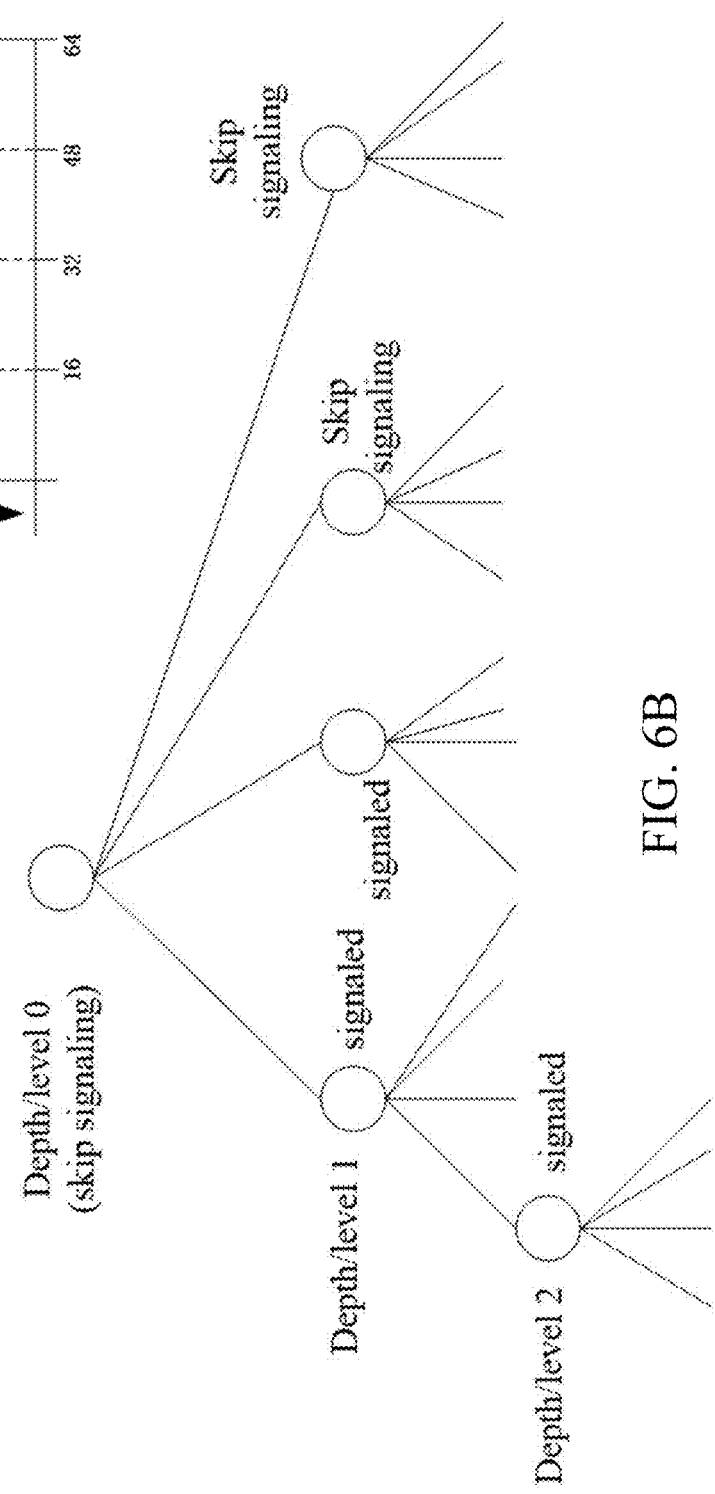
Figure 7A:
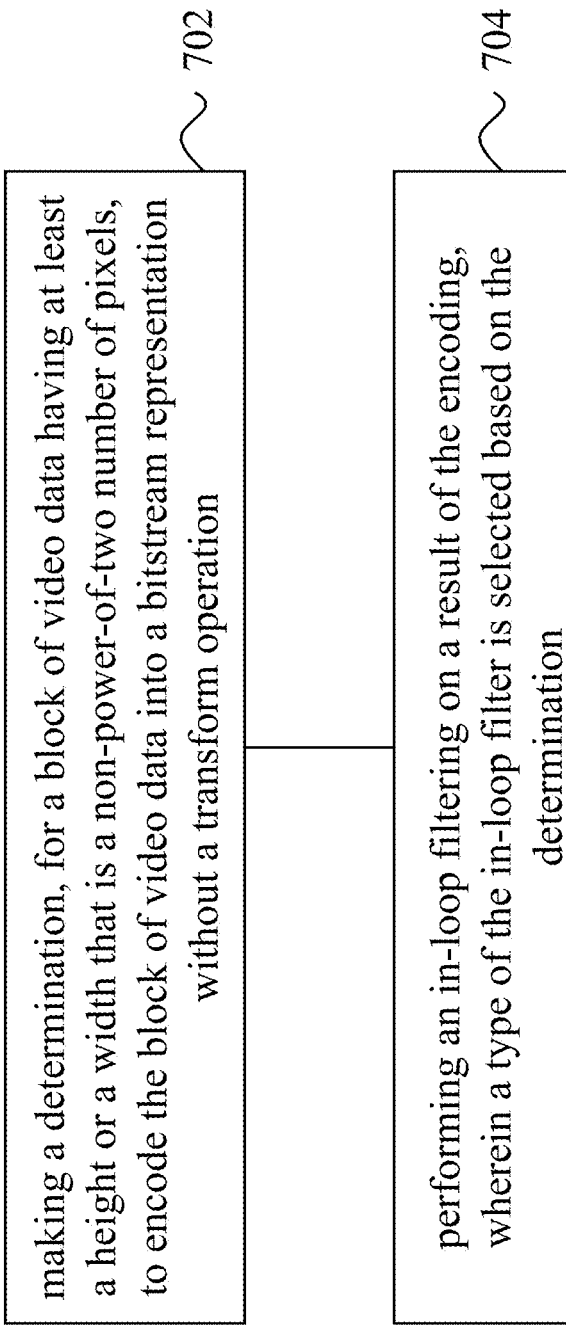
Figure 8A:
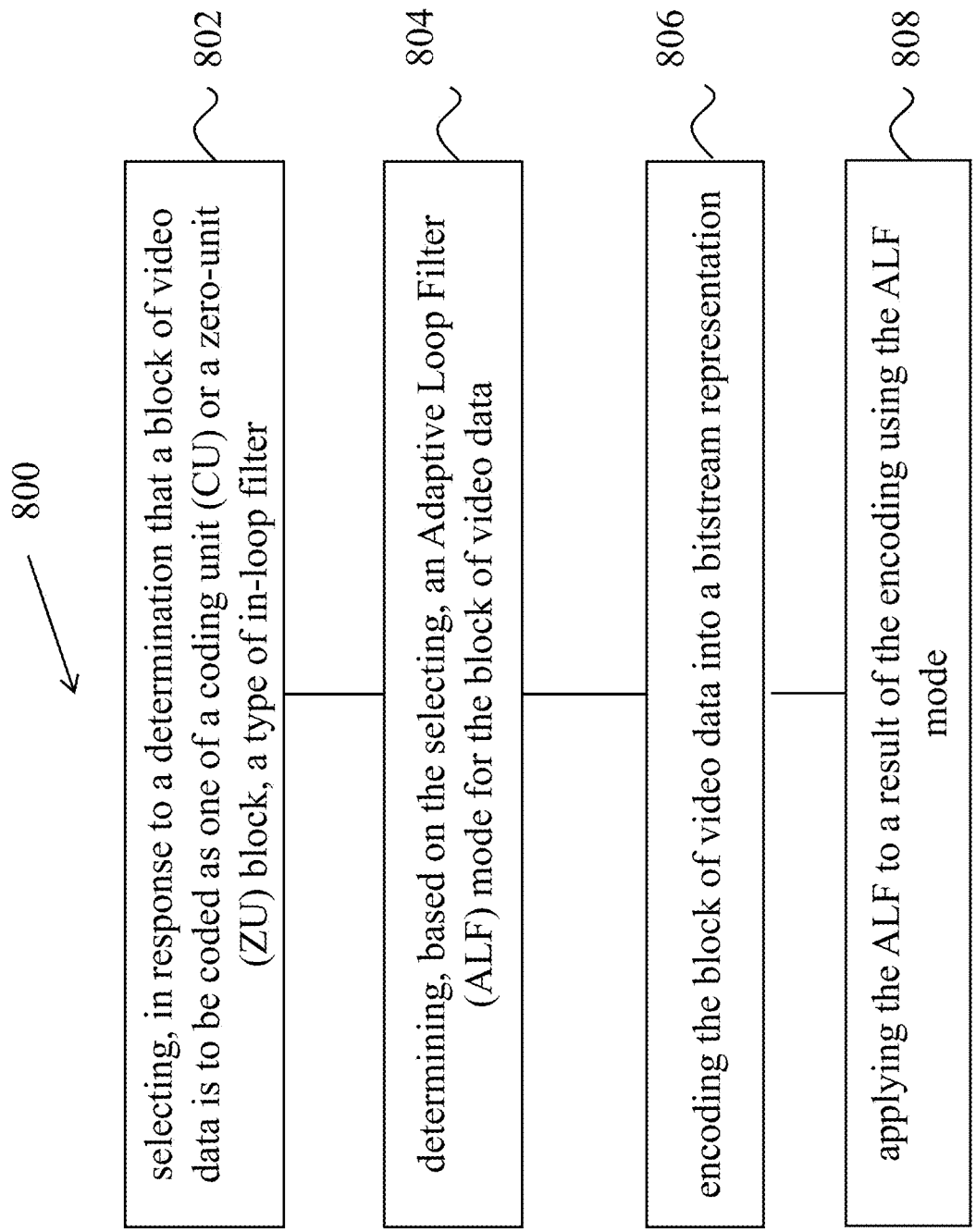
FIG. 8A-8B are flowcharts for video processing method examples.
Figure 8B:
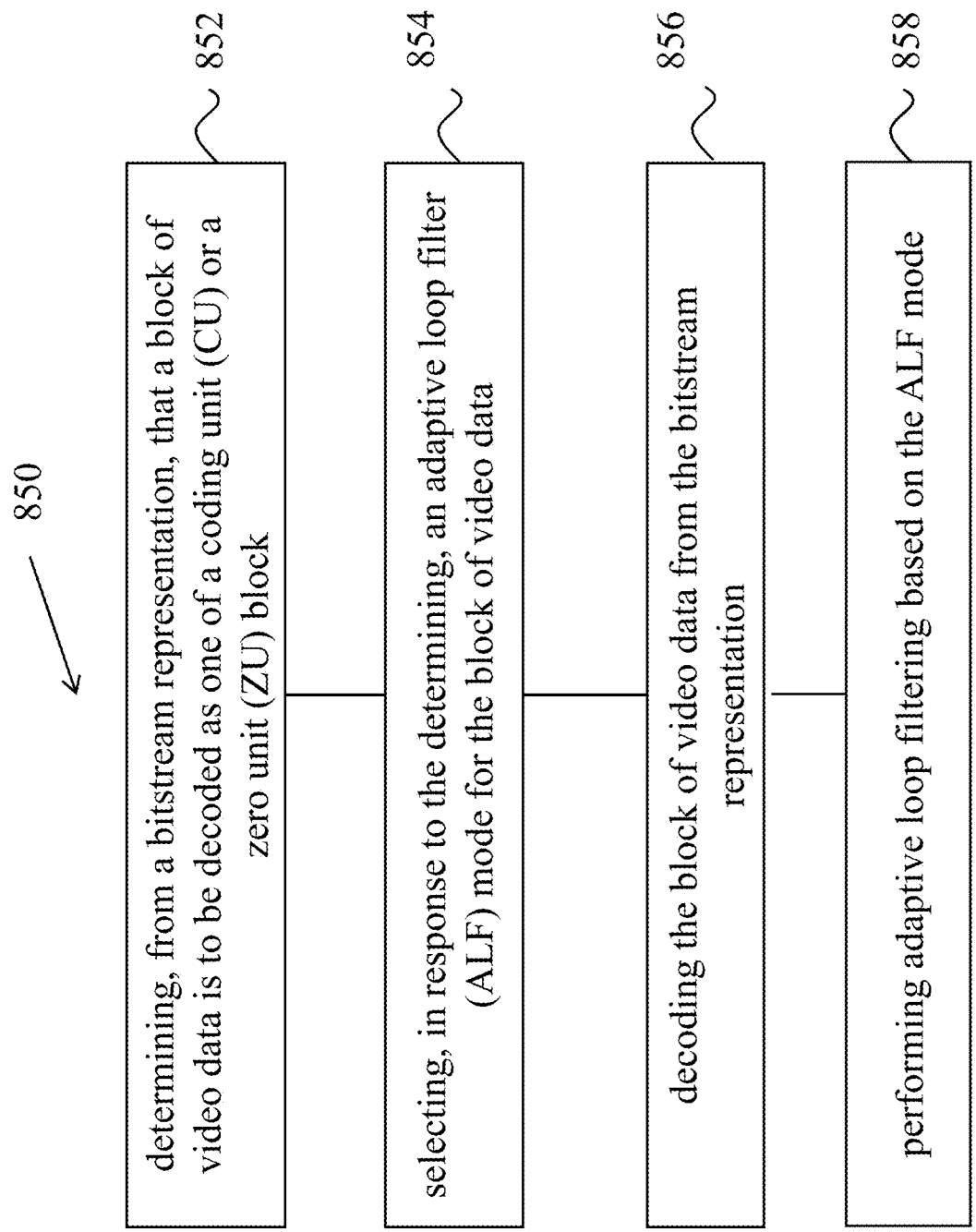
Figure 9A:
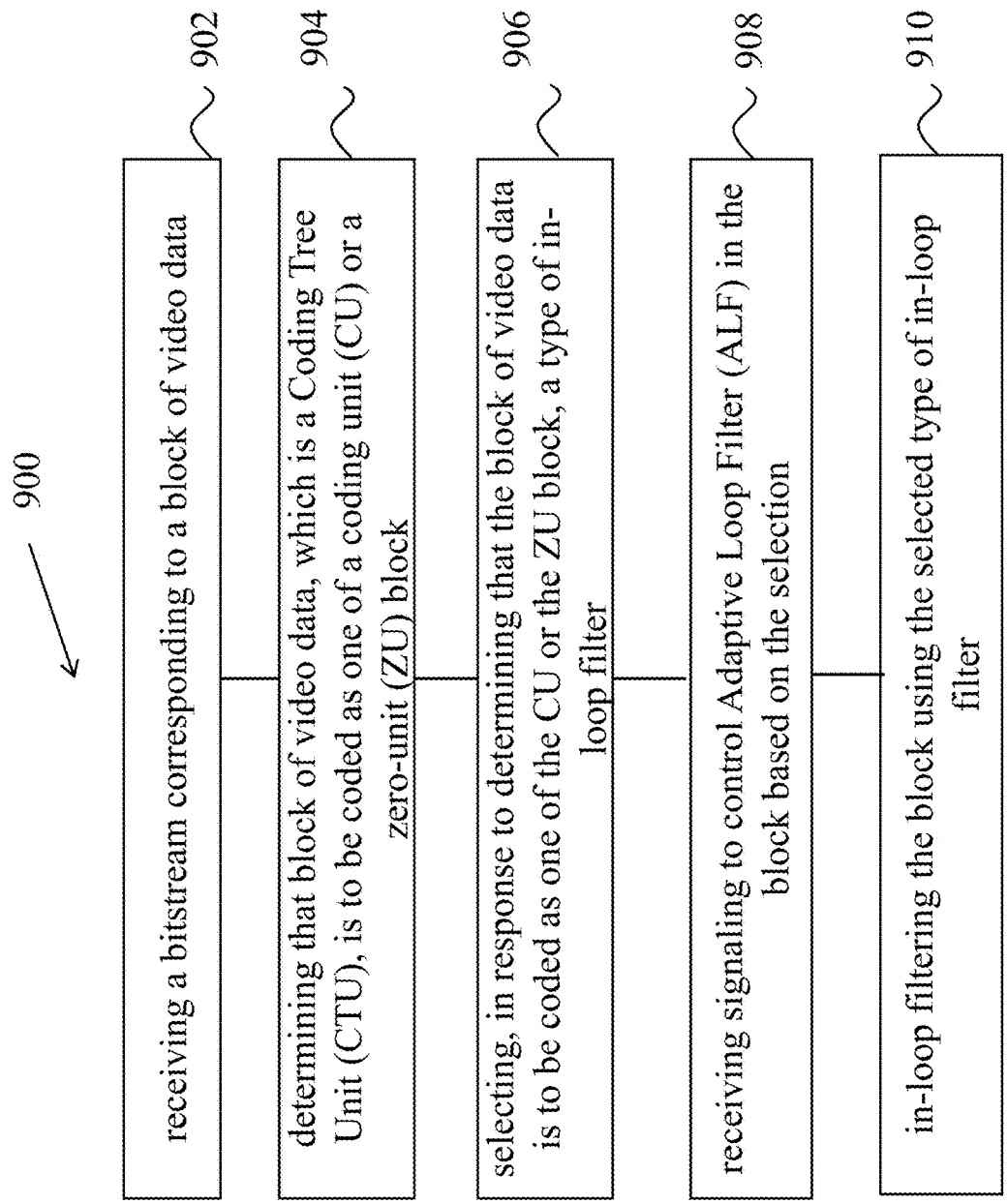
FIG. 9A-9C are flowcharts for video processing method examples.
Figure 9B:
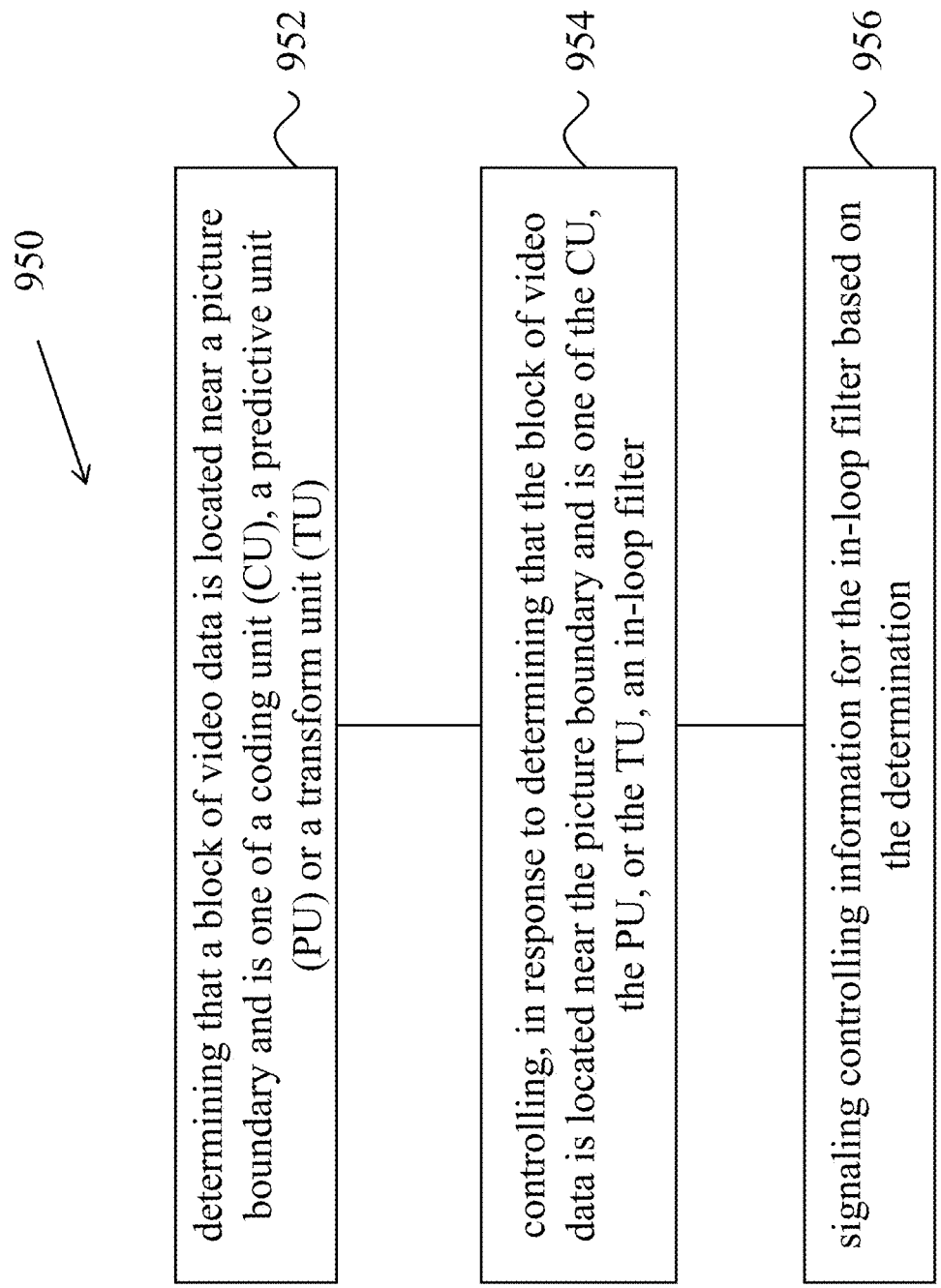
Figure 9C:
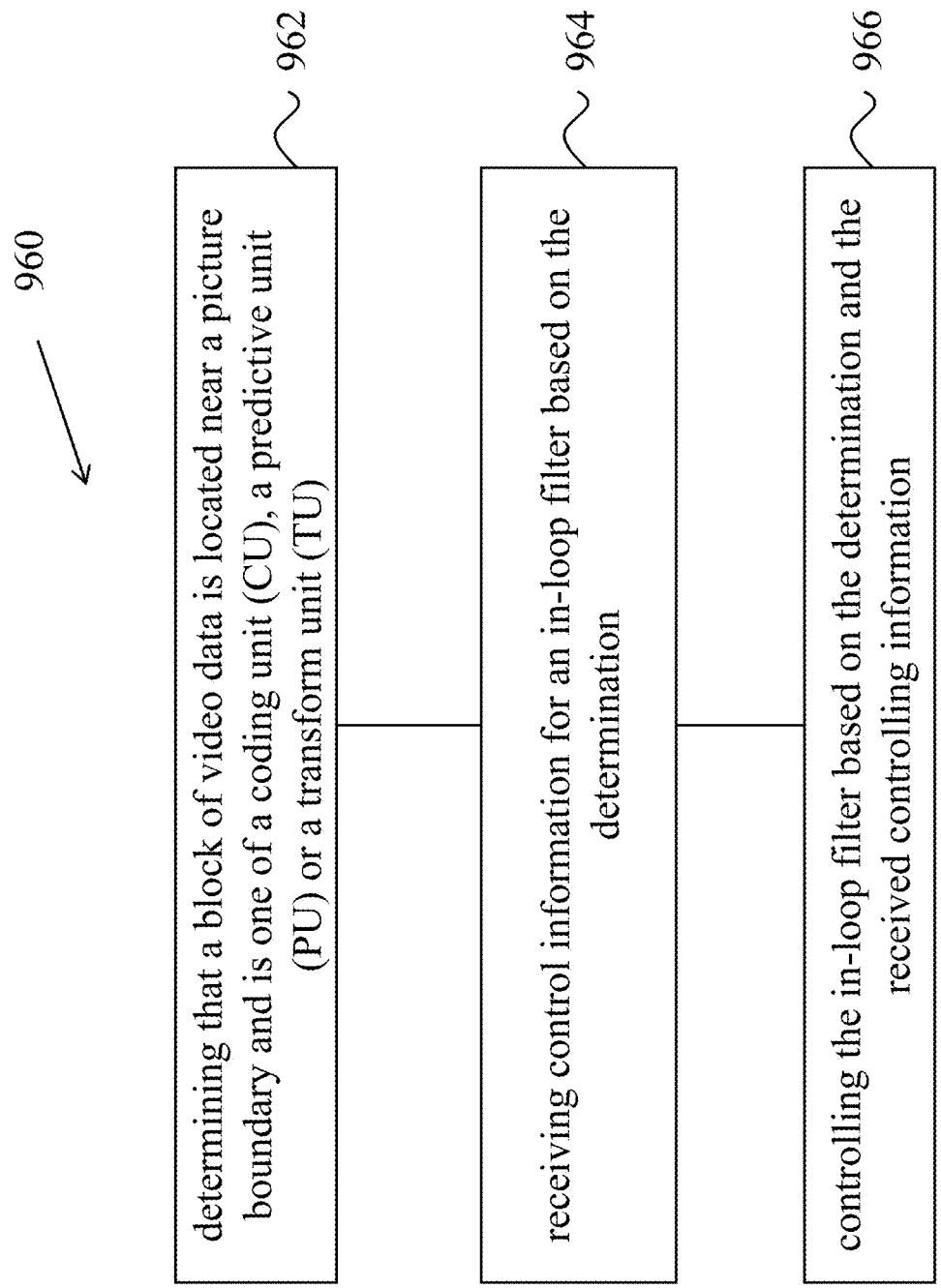

In the example shown in FIG. 5, the highlighted CTB (504), with row CTB index equal to 2 and column CTB index equal to 3, has 64×48 pixels within the current picture, and doesn't fit a 64×64 CTB. Therefore, it is forced to be split to 32×32 without the split flag signaled. For the top-left 32×32, it is fully covered by the frame. When it chooses to be coded in smaller blocks (8×8 for the top-left 16×16, and the remaining are coded in 16×16) according to rate-distortion cost, several split flags need to be coded. These split flags (one for whether split the top-left 32×32 to four 16×16 blocks, and flags for signaling whether one 16×16 is further split and 8×8 is further split for each of the four 8×8 blocks within the top-left 16×16) have to be explicitly signaled. A similar situation exists for the top-right 32×32 block. For the two bottom 32×32 blocks, since they are partially outside the picture border (506), further QT split needs to be applied without being signaled. FIGS. 6A and 6B show the subdivisions and signaling methods, respectively, of the highlighted CTB (504) in FIG. 5.

1.2.3. Examples of CTB Size Indications

An example RBSP (raw byte sequence payload) syntax table for the general sequence parameter set is shown in Table 1.

TABLE 1

| RBSP syntax structure | |
|---|---|
| | Descriptor |
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( 1, sps_max_sub_layers_minus1 ) | |
|   ... | |
|   log2_min_luma_coding_block_size_minus3 | ue(v) |
|   log2_diff_max_min_luma_coding_block_size | ue(v) |
|   log2_min_luma_transform_block_size_minus2 | ue(v) |
|   log2_diff_max_min_luma_transform_block_size | ue(v) |
|   .. | |
| } | |

The corresponding semantics includes:
log2_min_luma_coding_block_size_minus3 plus 3 specifies the minimum luma coding block size; and
log2_diff_max_min_luma_coding_block_size specifies the difference between the maximum and minimum luma coding block size.
The variables MinCbLog2SizeY, CtbLog2SizeY, MinCbSizeY, CtbSizeY, PicWidthInMinCbsY, PicWidthInCtbsY, PicHeightInMinCbsY, PicHeightInCtbsY, PicSizeInMinCbsY, PicSizeInCtbsY, PicSizeInSamplesY, PicWidthInSamplesC and PicHeightInSamplesC are derived as follows:

MinCbLog2SizeY=log2_min_luma_coding_block_size_minus3+3
CtbLog2SizeY=MinCbLog2SizeY+log2_diff_max_min_luma_coding_block_size
MinCbSizeY=1<<MinCbLog2SizeY
CtbSizeY=1<<CtbLog2SizeY
PicWidthInMinCbsY=pic_width_in_luma_samples/MinCbSizeY
PicWidthInCtbsY=Ceil(pic_width_in_luma_samples÷CtbSizeY)
PicHeightInMinCbsY=pic_height_in_luma_samples/MinCbSizeY
PicHeightInCtbsY=Ceil(pic_height_in_luma_samples÷CtbSizeY)
PicSizeInMinCbsY=PicWidthInMinCbsY*PicHeightInMinCbsY
PicSizeInCtbsY=PicWidthInCtbsY*PicHeightInCtbsY
PicSizeInSamplesY=pic_width_in_luma_samples*pic_height_in_luma_samples
PicWidthInSamplesC=pic_width_in_luma_samples/SubWidthC
PicHeightInSamplesC=pic_height_in_luma_samples/SubHeightC The variables CtbWidthC and CtbHeightC, which specify the width and height, respectively, of the array for each chroma CTB, are derived as follows:
If chroma_format_idc_is_equal to 0 (monochrome) or separate_colour_plane_flag is equal to 1, CtbWidthC and CtbHeightC are both equal to 0;
Otherwise, CtbWidthC and CtbHeightC are derived as follows:
CtbWidthC=CtbSizeY/SubWidthC
CtbHeightC=CtbSizeY/SubHeightC

1.3. Examples of Quadtree Plus Binary Tree Block Structures with Larger CTUs in Jem In some embodiments, future video coding technologies (Reference [3]) are explored using a reference software known as the Joint Exploration Model (JEM) (Reference [4]). In addition to binary tree structures, JEM describes quadtree plus binary tree (QTBT) and ternary tree (TT) structures.

Figure 11:
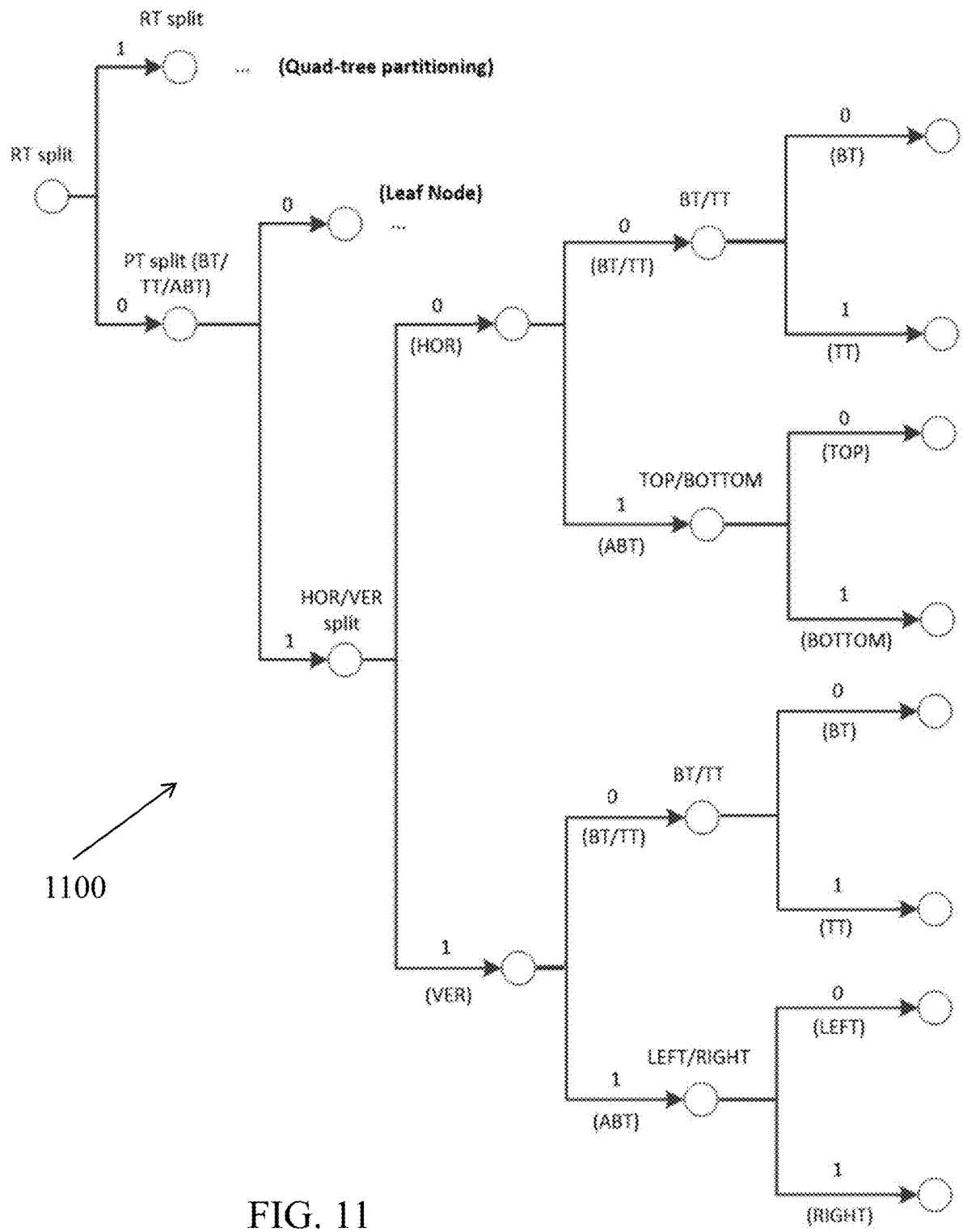
FIG. 11 shows an example of tree-type signaling.

1.5. Examples of Partitioning Structures in Alternate Video Coding Technologies In some embodiments, a tree structure called a Multi-Tree Type (MTT), which is a generalization of the QTBT, is supported. In QTBT, as shown in FIG. 11, a Coding Tree Unit (CTU) is firstly partitioned by a quad-tree structure. The quad-tree leaf nodes are further partitioned by a binary-tree structure.

The structure of the MTT constitutes of two types of tree nodes: Region Tree (RT) and Prediction Tree (PT), supporting nine types of partitions, as shown in FIG. 10A-10I. A region tree can recursively split a CTU into square blocks down to a 4×4 size region tree leaf node. At each node in a region tree, a prediction tree can be formed from one of three tree types: Binary Tree, Ternary Tree, and Asymmetric Binary Tree. In a PT split, it is prohibited to have a quadtree partition in branches of the prediction tree. As in JEM, the luma tree and the chroma tree are separated in I slices.

In general, RT signaling is same as QT signaling in JEM with exception of the context derivation. For PT signaling, up to 4 additional bins are required, as shown in FIG. 11. The first bin indicates whether the PT is further split or not. The context for this bin is calculated based on the observation that the likelihood of further split is highly correlated to the relative size of the current block to its neighbors. If PT is further split, the second bin indicates whether it is a horizontal partitioning or vertical partitioning. In some embodiments, the presence of the center-sided triple tree and the asymmetric binary trees (ABTs) increase the occurrence of "tall" or "wide" blocks. The third bin indicates the tree-type of the partition, i.e., whether it is a binary-tree/triple-tree, or an asymmetric binary tree. In case of a binary-tree/triple-tree, the fourth bin indicates the type of the tree. In case of asymmetric binary trees, the four bin indicates up or down type for horizontally partitioned trees and right or left type for vertically partitioned trees.

1.5.1. Examples of Restrictions at Picture Borders

In some embodiments, if the CTB/LCU size is indicated by M×N (typically M is equal to N, as defined in HEVC/JEM), and for a CTB located at picture (or tile or slice or other kinds of types) border, K×L samples are within picture border.

Figure 12B:
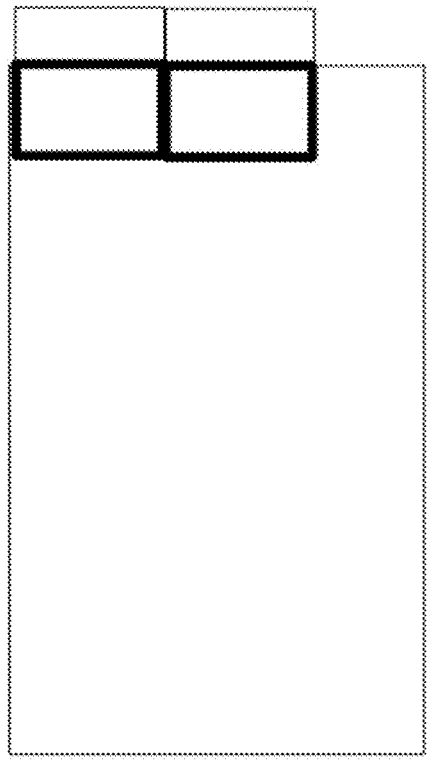
FIGS. 12A-12C show examples of CTBs crossing picture borders.
Figure 12C:
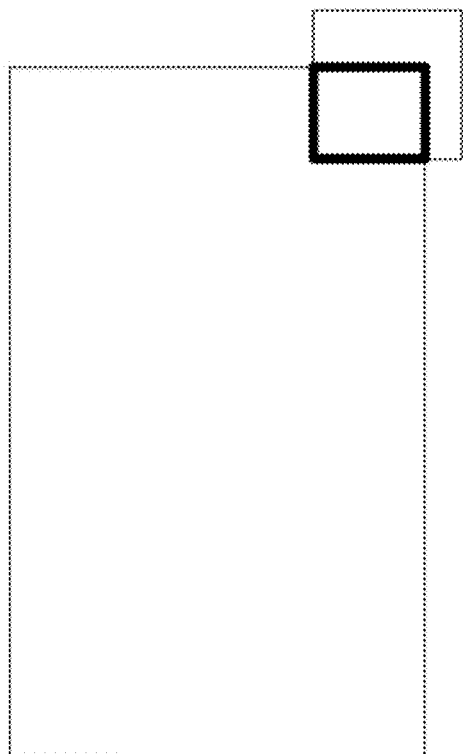
Figure 12A:
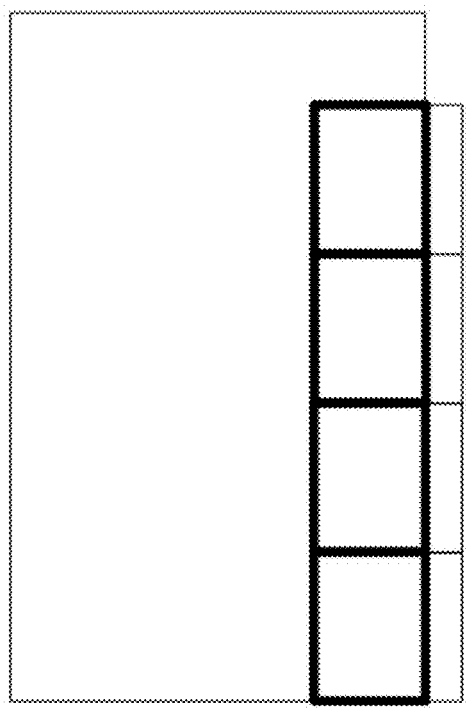

The CU splitting rules on the picture bottom and right borders may apply to any of the coding tree configuration QTBT+TT, QTBT+ABT or QTBT+TT+ABT. They include the two following aspects:
  (1) If a part of a given Coding Tree node (CU) is partially located outside the picture, then the binary symmetric splitting of the CU is always allowed, along the concerned border direction (horizontal split orientation along bottom border, as shown in FIG. 12A, vertical split orientation along right border, as shown in FIG. 12B). If the bottom-right corner of the current CU is outside the frame (as depicted in FIG. 12C), then only the quad-tree splitting of the CU is allowed. In addition, if the current binary tree depth is greater than the maximum binary tree depth and current CU is on the frame border, then the binary split is enabled to ensure the frame border is reached.
  (2) With respect to the ternary tree splitting process, the ternary tree split is allowed in case the first or the second border between resulting sub-CU exactly lies on the border of the picture. The asymmetric binary tree splitting is allowed if a splitting line (border between two sub-CU resulting from the split) exactly matches the picture border.

2. Examples of Existing Implementations

Existing implementations, the width or the height of a CTU or a CU may be not equal to $2^N$, where N is a positive integer. These cases are difficult to handle. Specifically, may be difficult to design a transform with integer-operations excluding division, if the number of rows or columns is not in a form of $2^N$.

In one example, to avoid a CTU or a CU with width or height not equal to $2^N$, the CTU or CU are forced to be split into smaller ones, until both the width and height are in the form of $2^N$ or by padding or using transform skip. The coding gain may be further improved if treating those blocks in a more flexible way.

In another example, transforms are defined for CUs with the width or the height not in the form of $2^N$. Such transforms are not desirable in practical video coding applications.

3. Example Methods Using Zero-Units Based on the Disclosed Technology

Embodiments of the presently disclosed technology overcome the drawbacks of existing implementations, thereby providing video coding with higher efficiencies. Specifically, the zero-unit block is proposed as a special CU/CTU, and a block is interpreted as a zero-unit if and only if its height and/or width are not of the form $2^N$.

The use of zero-units to improve video coding efficiency and enhance both existing and future video coding standards is elucidated in the following examples described for various implementations. The examples of the disclosed technology provided below explain general concepts, and are not meant to be interpreted as limiting. In an example, unless explicitly indicated to the contrary, the various features described in these examples may be combined. In another example, the various features described in these examples may be applied to methods for picture border coding that employ block sizes that are backward compatible and use partition trees for visual media coding.

Figure 13:
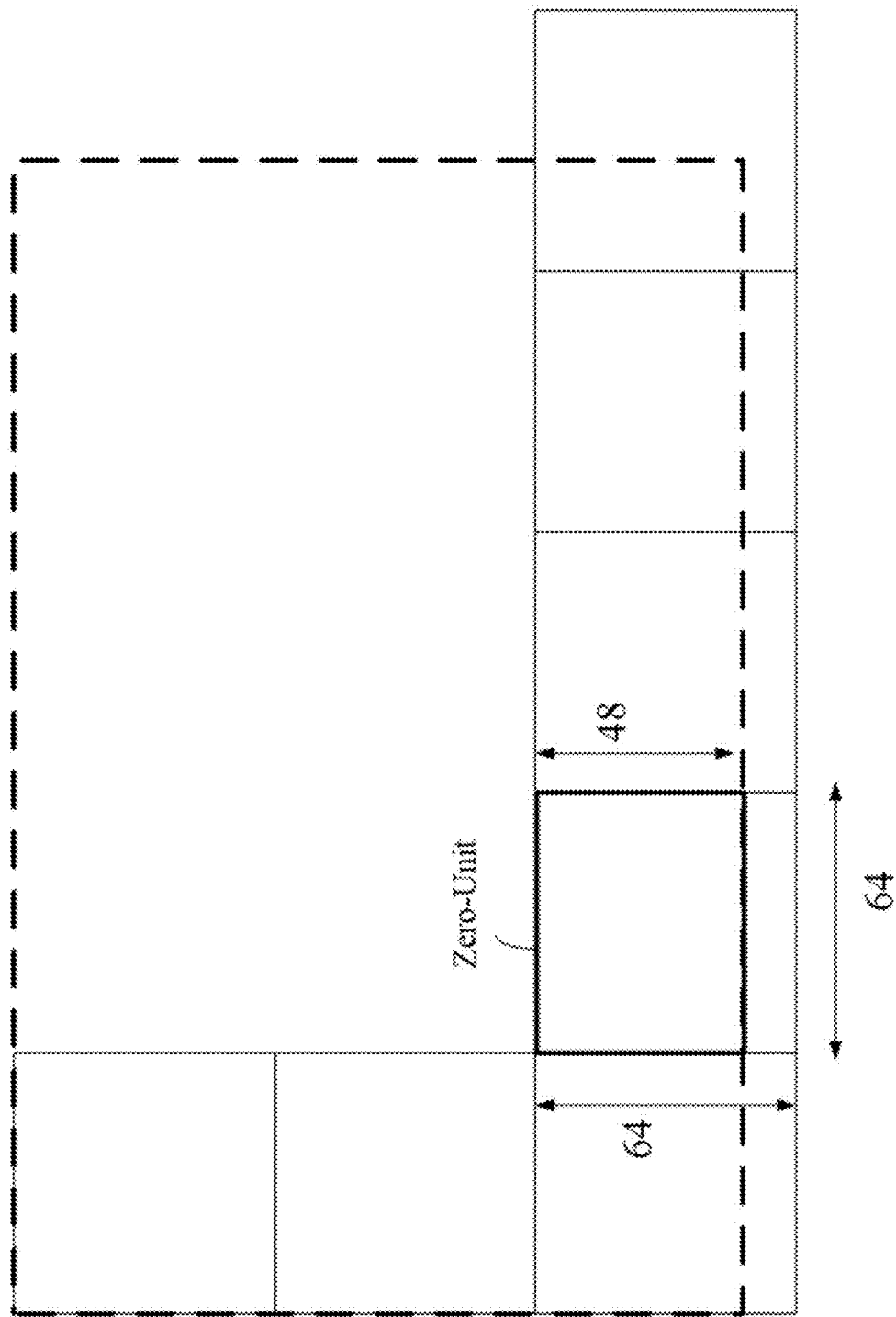
FIG. 13 shows an example of a zero-unit at a picture border.

Example 1. In one example, the width, or height, or both of a block can be any positive integer not in the form of $2^N$. Such a block is defined as a zero-unit (ZU) with all residuals set to 0. FIG. 13 shows an example of zero-unit at the picture border.
  (a) In one example, the width and height of a ZU must be an even number (in the form of 2N).
  (b) In one example, the width and height of a ZU must be in the form of $2^K N$ (e.g., K equal to 1, 2, 3, 4, etc.).

Example 2. In one example, it is proposed that for a zero-unit, no transform, inverse-transform, quantization and de-quantization operations are invoked.
  (a) In one example, a zero-unit is inferred to be coded with the skip mode; in this case, there is no need to signal the skip flag, and indications of intra or inter or other modes.
  (b) Alternatively, furthermore, the merge index may also be skipped.
    (i) The zero block may inherit the motion information from one of its neighboring blocks with size equal to $2^N \times 2^M$.
    (ii) In one example, the neighboring block is defined as the block in parallel to the border, such as for a zero unit located at the bottom border, it may inherit motion information from its above block.
    (iii) In one example, certain rules may be applied to select one of its neighboring block, such as continuities between the zero unit and its neighboring block.
    (iv) In one example, the motion information may be derived from motion information of neighboring blocks.
  (c) In one example, a zero-unit could be coded with skip or non-skip mode, and/or intra or inter modes. In this case, the conventional signaling of modes information is kept unchanged, however, no cbf_flag is signaled and all cbf_flags of the zero-unit are inferred as zero. Residual information, such as quantized coefficients or transform_skip_flag, is not signaled for a zero-unit.

Example 3. In one example, there may be residuals in a zero-unit. But there is no transform and inverse-transform operations for a zero-unit.
  (a) In one example, the residuals of a zero-unit are always coded with the transform-skip mode. Transform_skip_flag is not signaled and inferred to be one for a zero-unit.

Example 4. A split CU in the ABT partitioning can be a zero-unit.

Example 5. A CTU or a CU at the picture/slice/tile border can be a zero-unit.

(a) In one example, there is no need to signal a flag for the border CTU/CU. Only ZUs are allowed for the CUs lying on the picture borders.

(b) In one example, a flag is required for all border CTU/CUs to distinguish between normal CU and ZUs. I another example, this flag may be considered in conjunction with the size constraints described in Examples 6 and 7.

Example 6. The maximum and minimum of width/height of a zero-block can be predefined, or they may be signaled from the encoder to the decoder. In one example, they can be signaled in Video Parameter Set (VPS), Sequence Parameter Set (SPS), Picture Parameter Set (PPS), Slice header, Coding Tree Unit (CTU) or Coding Unit (CU).

Example 7. A zero-unit can be further split into two (BT or ABT), three (TT, FTT) or four (QT, EQT) units. A split unit split from a zero-unit can be a zero-unit, or it can be a normal CU with its width or height in the form of $2^N$. Suppose a zero-unit Z is with the size S×T.
  (a) In one example, Z can be split with BT into two units both with the size as S/2×T.
  (b) In one example, Z can be split with BT into two units both with the size as S×T/2.
  (c) In one example, suppose $2^N \leq S \leq 2^{N+1}$, Z can be split with BT into two units with the size as $2^N \times T$ and $(S-2^N) \times T$, or $(S-2N) \times T$ and $2^N \times T$.
  (d) In one example, suppose $2N < T \leq 2^{N+1}$, Z can be split with BT into two units with the size as $S \times 2^N$ and $S \times (T-2^N)$, or $S \times (T-2^N)$ and $S \times 2^N$.
  (e) In one example, Z can be split with TT into three units with the size as S/4×T, S/2×T and S/4×T.
  (f) In one example, Z can be split with TT into three units with the size as S×T/4, S×T/2 and S×T/4.
  (g) In one example, suppose $2^N < S < 2^{N+1}$, Z can be split with TT into three units with the size as $2^{N-1} \times T$ and $(S-2^N) \times T$, or $2^{N-1} \times T$, $(S-2^N) \times T$ and $2^{N-1} \times T$, or $(S-2^N) \times T$, $2^{N-1} \times T$ and $2^{N-1} \times T$.
  (h) In one example, suppose $2^N < T \leq 2^{N+1}$, Z can be split with TT into three units with the size as $S \times 2^{N-1}$, $S \times 2^{N-1}$ and $S \times (T-2^N)$, or $S \times 2^{N-1}$, $S \times (T-2^N)$ and $S \times 2^{N-1}$, or $S \times (T-2^N)$, $S \times 2^{N-1}$ and $S \times 2^{N-1}$.
  (i) In one example, Z can be split with QT into four units both with the size as S/2×T/2.
  (j) In one example, suppose $2^N \leq S \leq 2^{N+1}$, Z can be split with QT into four units with the size as $2^N \times T/2$, $2^N \times T/2$, $(S-2^N) \times T/2$ and $(S-2^N) \times T/2$, or $(S-2^N) \times T/2$, $(S-2^N) \times T/2$, $2^N \times T/2$ and $2^N \times T/2$.
  (k) In one example, suppose $2^N < T \leq 2^{N+1}$, Z can be split with QT into four units with the size as $S/2 \times 2^N$, $S/2 \times 2^N$, $S/2 \times (T-2^N)$ and $S/2 \times (T-2^N)$, or $S/2 \times (T-2^N)$, $S/2 \times (T-2^N)$, $S/2 \times 2^N$ and $S/2 \times 2^N$.
  (l) In one example, suppose $2^N \leq S \leq 2^{N+1}$ and $2^M < T \leq 2^{M+1}$ Z can be split with QT into four units with the size as $2^N \times 2^M$, $2^N \times 2^M$, $(S-2^N) \times (T-2^M)$ and $(S-2^N) \times (T-2^M)$, or $(S-2^N) \times (T-2^M)$, $(S-2^N) \times (T-2^M)$, $2^N \times 2^M$ and $2^N \times 2^M$, or $2^N \times (T-2^M)$, $2^N \times (T-2^M)$, $(S-2^N) \times 2^M$ and $(S-2^N) \times 2^M$, or $(S-2^N) \times 2^M$, $(S-2^N) \times 2^M$, $2^N \times (T-2^M)$ and $2^N \times (T-2^M)$.
  (m) In one example, the width/height of all split units shall be even. If one partition structure results in a unit with either width or height to be odd, such a partition structure is automatically disallowed.
  Alternatively, furthermore, the signaling of such a partition structure is skipped.
  (n) In one example, Z can be split with TT into three units. In one example, suppose $3*2^N < S \leq 3*2^{N+1}$, the three units size are $2^N \times T$, $2^{N+1} \times T$ and $(S-3*2^N) \times T$, respectively.

In one example, suppose $3*2^N < T \leq 3*2^{N+1}$, the three units size are $S \times 2^N$, $S \times 2^{N+1}$ and $S \times (T-3*2^N)$, respectively.
  (o) In one example, the width and/or height of all split units shall be in a form of K*M, where M is the minimum width and/or height of allowed coding units/prediction units, such as 4; K is an integer larger than 0. If one partition structure results in a unit with either width or height not in such a form that partition structure is automatically disallowed.

For example, suppose the width and height of a split unit in a partition structure is W and H, if W<M or H<M or (W&(M-1)!=0) or (H&(M-1)!=0), then the partition structure is disallowed.

Alternatively, furthermore, the signaling of such a partition structure is skipped.

Alternatively, width and/or height of all split non-ZUs shall be in a form of K*M, where M is the minimum width and/or height of allowed coding units/prediction units, such as 4. In this case, if a split zero unit doesn't follow this restriction but non-ZUs follow this restriction, the partition structure is still allowed.

Example 8. The splitting signaling method of a ZU is the same to that of a normal CU.
  a. In one example, different contexts may be utilized to code ZU or non-ZUs.
  b. Alternatively, only partial splitting methods of a normal CU are allowed for a ZU.
    i. The sub-set of splitting methods of a normal CU allowed for a ZU is determined by the ZU size, and/or picture/slice/tile boundary positions (bottom, right, bottom-right etc. al), and/or slice type.
    ii. In one example, only QT and BT partition structures are allowed for a ZU.
    iii. Alternatively, furthermore, whether and how to use TT (and other kinds of partition structures except QT/BT) is not signaled in a ZU splitting information.
    iv. Alternatively, furthermore, the splitting signaling method of a ZU is still kept the same to that of a normal CU, however, the context for indications of TT (or other kinds of partition structures) may further depend on whether the current block is a ZU or not.

Example 9. In one example, blocks with both width and height equal to $(2^N \times 2^M)$ could also be defined as ZUs.
  a) In this case, like other ZUs (with either width or height unequal to $2^N$), no transform, inverse-transform, quantization and de-quantization operations are invoked as claimed in item 2.
  b) Suppose the size of a CU is W×H, then the CU is treated as a ZU if
    i) W>=T0 and H>=T1. T0 and/or T1 is an integer such as 128 or 256.
    ii) W>=T0 or H>=T1. T0 and/or T1 is an integer such as 128 or 256.
    iii) W×H>=T. T is an integer such as 16384 or 65536.

Example 10. In one embodiment, ZU must be an inter-coded block.
  (a) In one example, ZU can only be used in P/B-picture/slice.
  (b) In one example, the prediction_mode_flag is not signaled for a ZU, and is always inferred as inter-coded.
  (c) In one example, the ZU can be used in conjunction with the geometric partitioning (Reference [6]) for motion prediction, such that the inter prediction can generate predictors which are better fit to the motion and texture of the video.

(i) In one example, the allowed partitioning types can depend on the shape of the parent partitioning. For example, if the aspect ratio of a block is greater or equal to 4 (width) to 1 (height), angles closer to the horizontal lines should be prohibited. If the aspect ratio is smaller or equal to 4 (width) to 1 (height), angles closer to vertical lines should be prohibited.

(ii) In one example, only the merge mode is available for the sub motion partitioning to save overhead bits.

(iii) In one example, both merge and regular AMVP mode are available for the sub motion partitioning. Whether the regular AMVP mode is allowed can also be signaled through the slice header such that the effective coding modes can be adaptive to the video content.

(d) In one example, a smaller set of motion unit can be used to better predict the ZUs. For example, 2×2 ATMVP and 2×2 affine mode can be allowed for ZUs. This also helps minimizes the impact of corner cases when the either width or height of a ZU is 2.

Example 11. In one example, a ZU must be split in an I-slice or intra-coded picture.

(a) In one example, the width or height of the ZU is not in the form of $2^N$.

(b) In one example, the CU is treated as a ZU if:
  i. W>=T0 and H>=T1. T0 and/or T1 is an integer such as 128 or 256.
  ii. W>=T0 or H>=T1. T0 and/or T1 is an integer such as 128 or 256.
  iii. W×H>=T. T is an integer such as 16384 or 65536.

Example 12. The strength of in-loop filtering should be set to strong for ZUs.

(a) In one example, the strong filter for de-blocking should be used for ZUs.

(b) In one example, the strong bi-lateral filter should be used for ZUs.

(c) In one example, a motion-compensated smoothing filter (e.g., Overlapped Block Motion Compensation) can be used.

Example 13. Enabling/disabling Adaptive Loop Filter (ALF) could be done in different ways for a ZU and a normal CU.

(a) In one example, if a CTU is a ZU, the whole ZU is controlled to conduct ALF or not as a whole, instead of partitioned into sub-blocks to do the ALF on/off control. Correspondingly, only one alf_control_flag is signaled for such a CTU.

(b) In another example, if a CTU is ZU, the ZU is partitioned into N sub-blocks to do the ALF on/off control. This partitioning does not depend on the ZU or CU split inside the CTU. Correspondingly, multiple (e.g., up to N) alf_control_flag is signaled for such a CTU.

(i) For example, if the CTU size is W×H, the sub-block size is w×h, then (1) In one example, the CTU is partitioned into (W+w−1)/w columns and (H+h−1)/h rows sub-blocks (all divisions are integer divisions defined in C). The sub-blocks in the last row/last column may be smaller than others.

(2) In one example, the CTU is partitioned into W/w columns and H/h rows sub-blocks (all divisions are integer divisions defined in C). The sub-blocks in the last row/last column may be bigger than others.

Figure 18A:
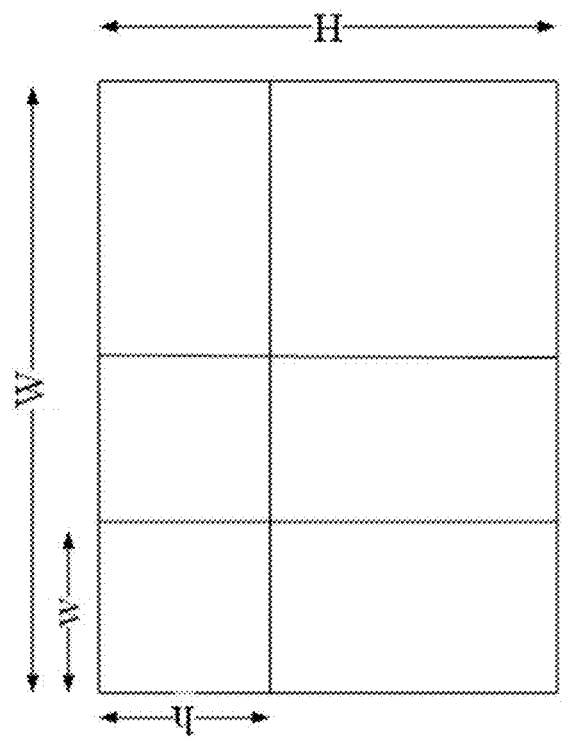
FIGS. 18A and 18B show examples of partitioning a ZU block into sub-blocks for Adaptive Loop Control (ALF) on/off control.
Figure 18B:
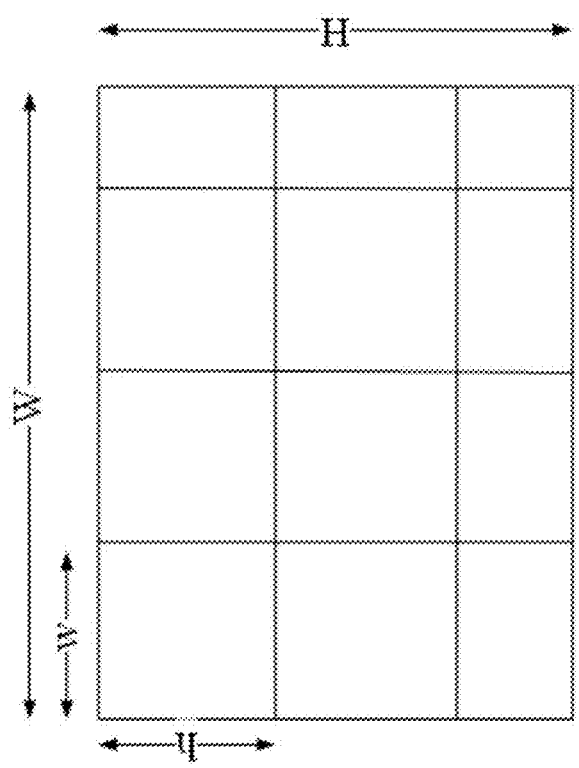

FIGS. 18A and 18B show examples of partitioning a ZU block into sub-blocks for Adaptive Loop Control (ALF) on/off control.

(c) If one ZU is located at the picture boundary, ALF is automatically disabled without any signaling.

(d) The above methods may be extended to other kinds of filtering methods which requires signaling of block-level on/off control flags.

Example 14. ALF or other kinds of filtering methods that requires block-level on/off control flags may be automatically disabled for a CU/PU/TU located at picture boundaries.

(a) In this case, the signaling of on/off control flags for these blocks are skipped.

The examples described above may be incorporated in the context of the methods described below, e.g., methods 1400 and 1500, which may be implemented at a video decoder and/or video encoder.

Figure 14:
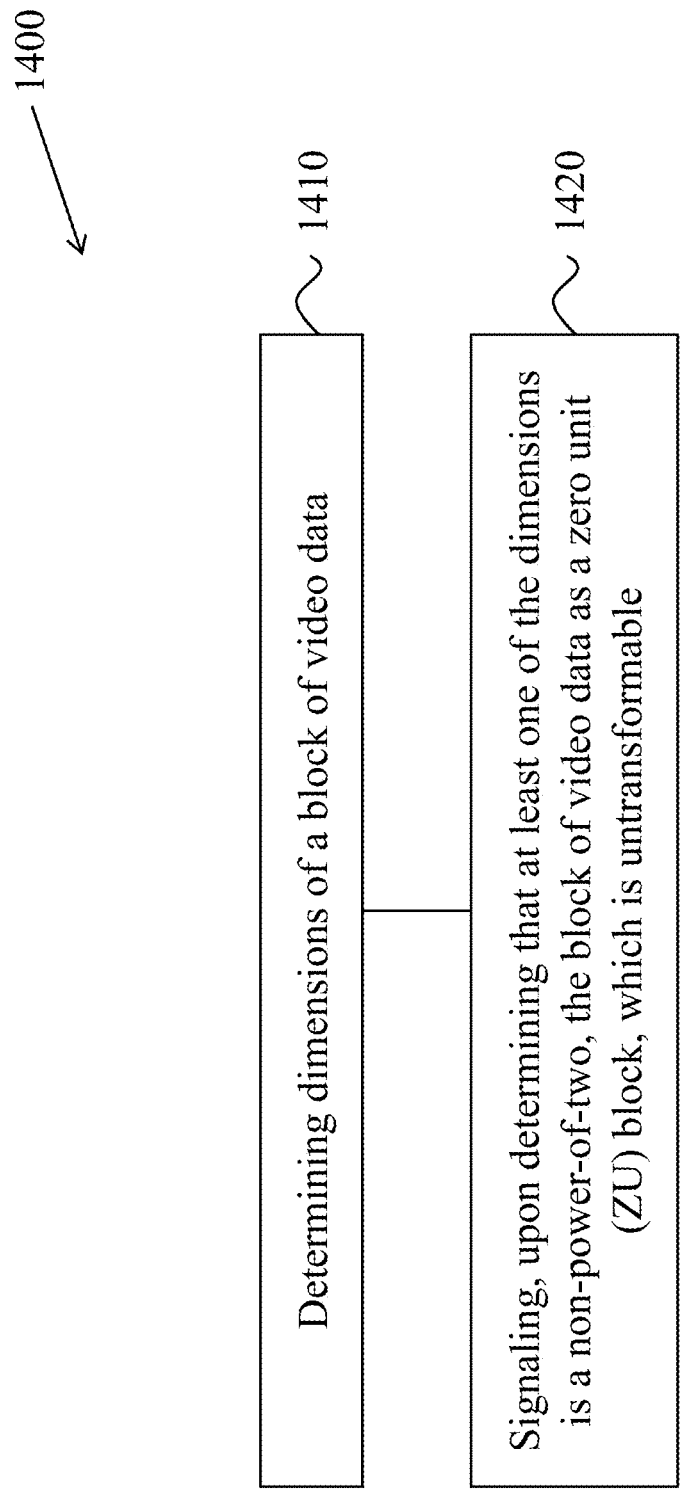
FIG. 14 shows a flowchart of an example method for video encoding in accordance with the presently disclosed technology.

FIG. 14 shows a flowchart of an exemplary method for video coding, which may be implemented in a video encoder. The method 1400 includes, at step 1410, determining dimensions of a block of video data.

The method 1400 includes, at step 1420, signaling, upon determining that at least one of the dimensions is a non-power-of-two, the block of video data as a zero unit (ZU) block, which is untransformable.

In some embodiments, a non-power-of-two is any non-zero number that cannot be represented in the form $2^N$. For example, the integers excluding the powers of two (e.g., 1, 3, 5, 6, 7, 9, 10, 11, 12, 13, 14, 15, 17, 18, . . . ) are each a non-power-of-two.

In some embodiments, untransformable may be defined such that no transform, inverse-transform, quantization and de-quantization operations are invoked for a zero-unit. For example, the untransformable property of a zero-unit is that it is inferred to be coded with the skip mode, and thus, the skip mode need not be explicitly signaled. In other embodiments, untransformable may be defined in the context of Example 3, such that although there may be non-zero residuals, there are no transform and inverse-transform operations defined for a zero-unit.

Figure 15:
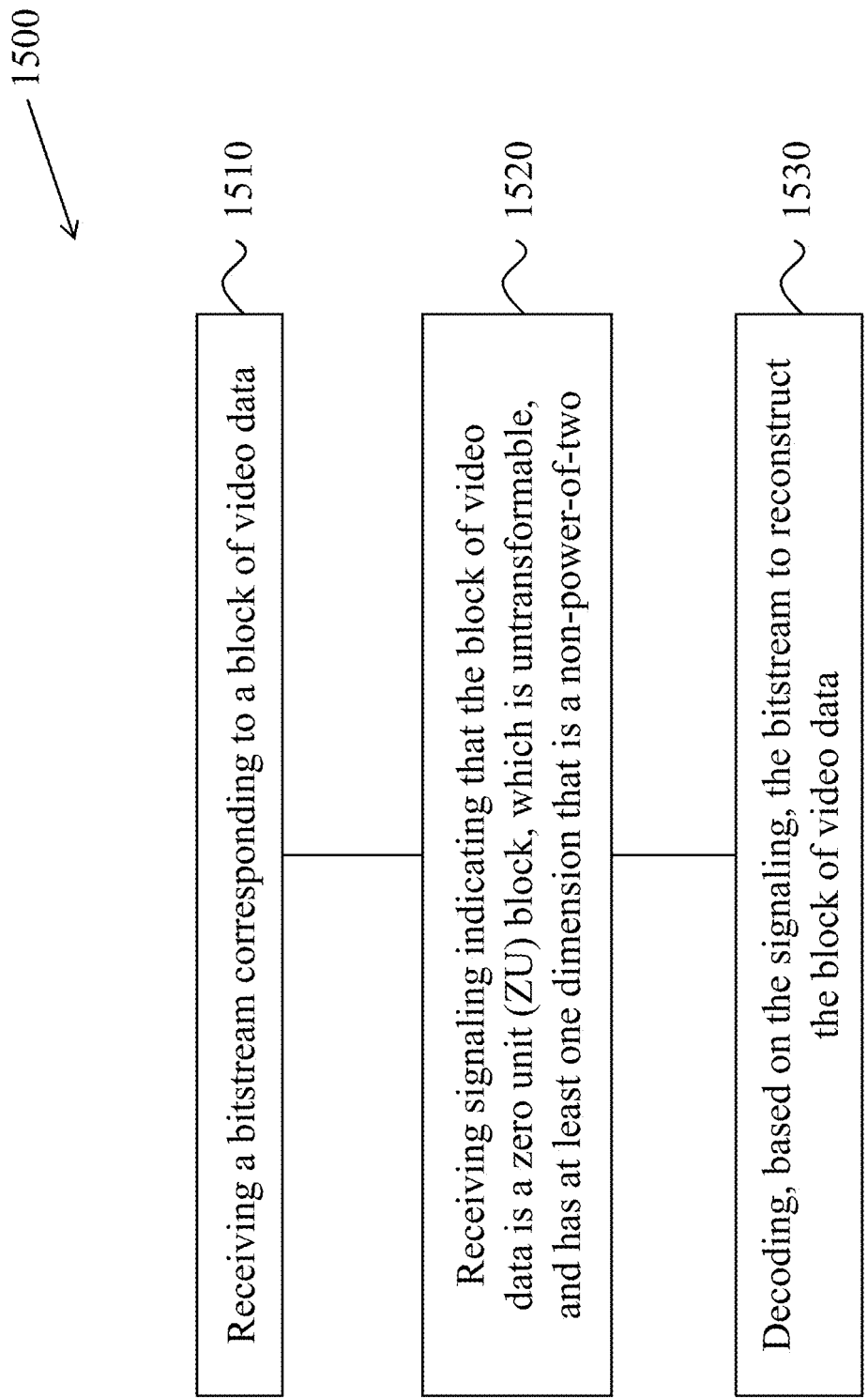
FIG. 15 shows a flowchart of another example method for video decoding in accordance with the presently disclosed technology.

FIG. 15 shows a flowchart of another exemplary method for video coding, which may be implemented in a video decoder. This flowchart includes some features and/or steps that are similar to those shown in FIG. 14, and described above. At least some of these features and/or steps may not be separately described in this section.

The method 1500 includes, at step 1510, receiving a bitstream corresponding to a block of video data.

The method 1500 includes, at step 1520, receiving signaling indicating that the block of video data is a zero unit (ZU) block, which is untransformable, and has at least one dimension that is a non-power-of-two.

The method 1500 includes, at step 1530, decoding, based on the signaling, the bitstream to reconstruct the block of video data.

In some embodiments, the methods 1400 and 1500, and as described in the context of Example 1, may further include the dimensions of the block of video data being an even number of the form 2N, or of the form $2^K N$ with K=1, 2, 3, 4, . . . . In other embodiments, the signaling may exclude a merge index or a skip flag, and/or exclude a prediction_mode_flag, and/or include a maximum or minimum value for at least one of the dimensions of the ZU block. In an example, the signaling is in a Video Parameter Set (VPS), a Sequence Parameter Set (SPS), a Picture Parameter Set (PPS), a slice header, a coding tree unit (CTU) or a coding unit (CU).

In some embodiments, motion information of the ZU block is inherited from motion information of a neighboring block of size $2^N \times 2^M$.

In some embodiments, and as described in the context of Example 7, the ZU block is split into two or more units. In an example, at least one of the two or more units is a zero unit. In another example, at least one of the two or more units is a coding unit (CU) with dimensions $2^N \times 2^M$.

Figure 16:
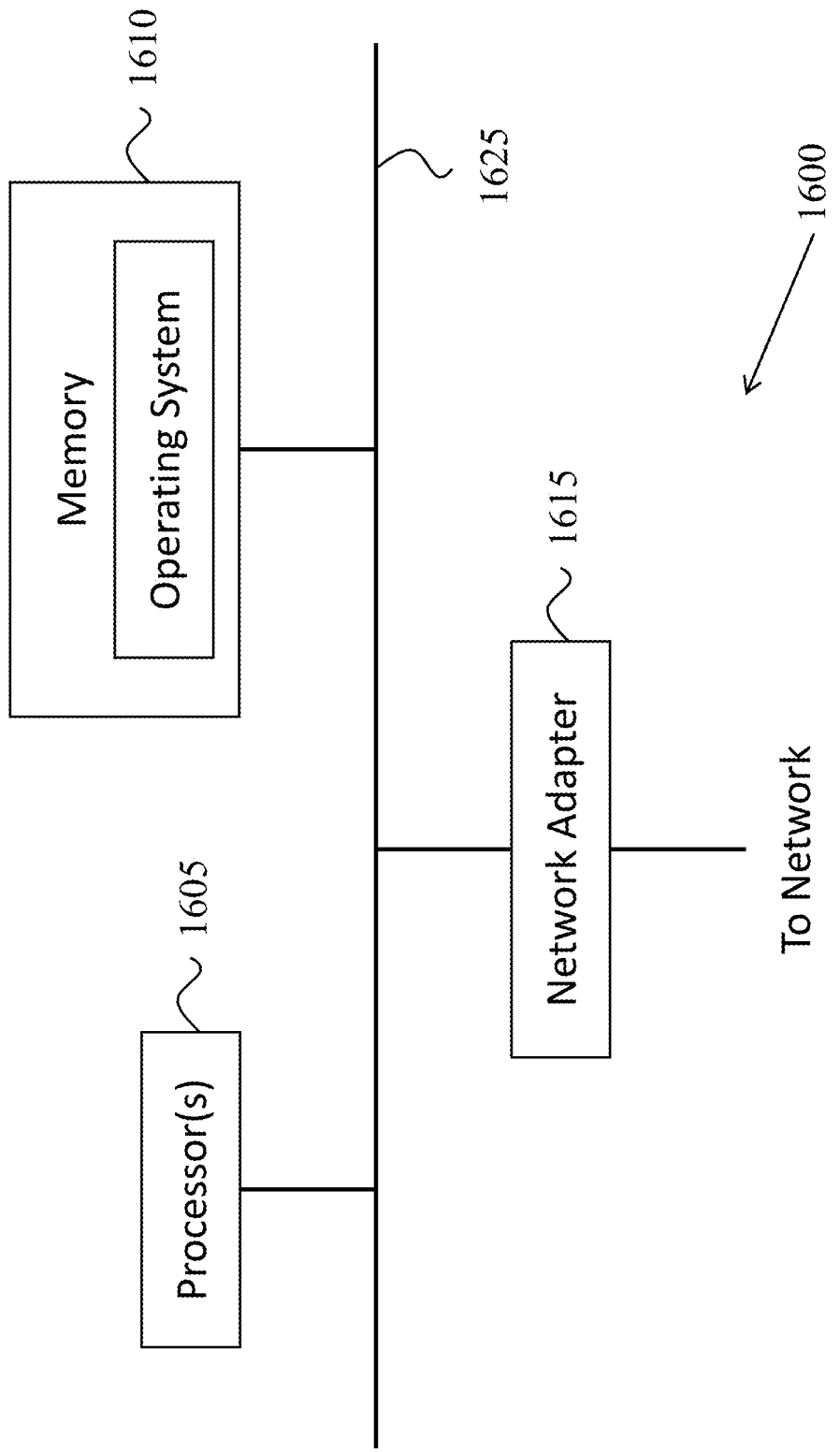
FIG. 16 is a block diagram illustrating an example of the architecture for a computer system or other control device that can be utilized to implement various portions of the presently disclosed technology.

In some embodiments, and as described in the context of Example 10, the strength of in-loop filtering for the ZU block is set to strong. In the example of the HEVC standard, a "strong" filter modifies three pixels on each side of the pixel of interest, whereas a "weak" filter modifies one or two pixels on each side. For example, the in-loop filtering includes bi-lateral filtering, de-blocking filtering, and/or using a motion-compensated smoothing filter. 4. Example implementations of the disclosed technology FIG. 16 is a block diagram illustrating an example of the architecture for a computer system or other control device 1600 that can be utilized to implement various portions of the presently disclosed technology, including (but not limited to) methods 1400 and 1500. In FIG. 16, the computer system 1600 includes one or more processors 1605 and memory 1610 connected via an interconnect 1625. The interconnect 1625 may represent any one or more separate physical buses, point to point connections, or both, connected by appropriate bridges, adapters, or controllers. The interconnect 1625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1605 may include central processing units (CPUs) to control the overall operation of, for example, the host computer. In certain embodiments, the processor(s) 1605 accomplish this by executing software or firmware stored in memory 1610. The processor(s) 1605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1610 can be or include the main memory of the computer system. The memory 1610 represents any suitable form of random access memory (RAM), read-only memory (ROM), flash memory, or the like, or a combination of such devices. In use, the memory 1610 may contain, among other things, a set of machine instructions which, when executed by processor 1605, causes the processor 1605 to perform operations to implement embodiments of the presently disclosed technology.

Also connected to the processor(s) 1605 through the interconnect 1625 is a (optional) network adapter 1615. The network adapter 1615 provides the computer system 1600 with the ability to communicate with remote devices, such as the storage clients, and/or other storage servers, and may be, for example, an Ethernet adapter or Fiber Channel adapter.

Figure 17:
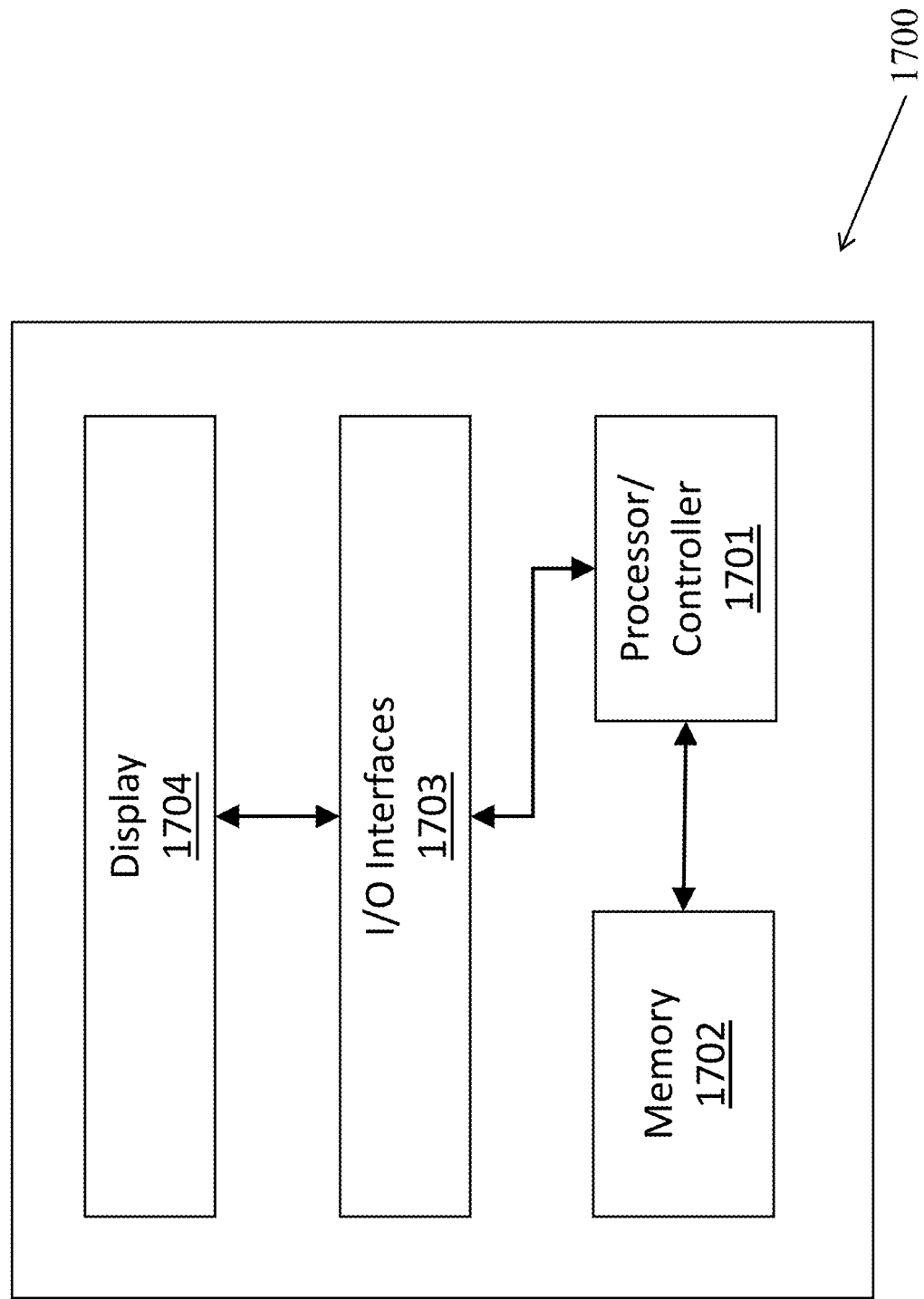
FIG. 17 shows a block diagram of an example embodiment of a mobile device that can be utilized to implement various portions of the presently disclosed technology.

FIG. 17 shows a block diagram of an example embodiment of a mobile device 1700 that can be utilized to implement various portions of the presently disclosed technology, including (but not limited to) methods 700, 750, 800, 850, 900, 950, 600, 1400 and 1500. The mobile device 1700 can be a laptop, a smartphone, a tablet, a camcorder, or other types of devices that are capable of processing videos. The mobile device 1700 includes a processor or controller 1701 to process data, and memory 1702 in communication with the processor 1701 to store and/or buffer data. For example, the processor 1701 can include a central processing unit (CPU) or a microcontroller unit (MCU). In some implementations, the processor 1701 can include a field-programmable gate-array (FPGA). In some implementations, the mobile device 1700 includes or is in communication with a graphics processing unit (GPU), video processing unit (VPU) and/or wireless communications unit for various visual and/or communications data processing functions of the smartphone device. For example, the memory 1702 can include and store processor-executable code, which when executed by the processor 1701, configures the mobile device 1700 to perform various operations, e.g., such as receiving information, commands, and/or data, processing information and data, and transmitting or providing processed information/data to another device, such as an actuator or external display.

To support various functions of the mobile device 1700, the memory 1702 can store information and data, such as instructions, software, values, images, and other data processed or referenced by the processor 1701. For example, various types of Random Access Memory (RAM) devices, Read Only Memory (ROM) devices, Flash Memory devices, and other suitable storage media can be used to implement storage functions of the memory 1702. In some implementations, the mobile device 1700 includes an input/output (I/O) unit 1703 to interface the processor 1701 and/or memory 1702 to other modules, units or devices. For example, the I/O unit 1703 can interface the processor 1701 and memory 1702 with to utilize various types of wireless interfaces compatible with typical data communication standards, e.g., such as between the one or more computers in the cloud and the user device. In some implementations, the mobile device 1700 can interface with other devices using a wired connection via the I/O unit 1703. The mobile device 1700 can also interface with other external interfaces, such as data storage, and/or visual or audio display devices 1704, to retrieve and transfer data and information that can be processed by the processor, stored in the memory, or exhibited on an output unit of a display device 1704 or an external device. For example, the display device 1704 can display a video frame that includes a block (a CU, PU or TU) that applies the intra-block copy based on whether the block is encoded using a motion compensation algorithm, and in accordance with the disclosed technology.

In some embodiments, a video decoder apparatus may implement a method of using zero-units as described herein is used for video decoding. The various features of the method may be similar to the above-described method 1500.

In some embodiments, the video decoding methods may be implemented using a decoding apparatus that is implemented on a hardware platform as described with respect to FIG. 16 and FIG. 17.

Some embodiments described herein may be captured using the following listing of example solutions. In the solutions, the receiving operation may include receiving a bitstream over a network connection or from a storage unit (a memory, an optical drive, etc.) that stores the bitstream.
1. A method for video encoding, comprising: determining that a block of video data is a zero-unit (ZU) block based on at least one of the dimensions being a non-power-of-two number; coding, in response to the determining that the block of video data is a ZU block, the ZU block with all residuals set to zero; and signaling the coded ZU block in a bitstream.
2. A method of video decoding, comprising: receiving a bitstream corresponding to a block of video data;

determining that the block of video data is coded as a zero-unit (ZU) block with all residuals set to zero due to at least one dimension of the block being a non-power-of-two number; and decoding, based on the determination, the block of video data.
3. The method of solution 1 or 2, wherein any one of the dimensions of the block of video data is an even number of the form 2N.
4. The method of solution 1 or 2, wherein any one of the dimensions of the block of video data is of the form 2KN where K is an integer.
5. The method of solution 1 or 2, wherein a transform operation or an inverse-transform operation is not performed on the ZU block.
6. The method of solution 1 or 2, wherein a quantization operation or de-quantization operation is not performed on the ZU block.
7. The method of solution 1 or 2, wherein the signaling excludes any syntax element indicating a prediction mode.
8. The method of solution 7, wherein the ZU block is inferred to be coded with a skip mode.
9. The method of solution 7 or 8, wherein the signaling excludes a merge index.
10. The method of solution 1 or 2, wherein the motion information of the ZU block is inherited from motion information of a neighboring block.
11. The method of solution 1 or 2, wherein motion information of the ZU block is inherited from motion information of a neighboring block of size 2N×2M.
12. The method of solution 11, wherein the neighboring block has a side parallel to a side of the ZU block contacting a picture border.
13. The method of solution 11, wherein the ZU block has a continuity with the neighboring block.
14. The method of solution 1 or 2, wherein the signaling does not include a cbf_flag and a cbf_flag of the ZU block is inferred to be zero.
15. The method of solution 1 or 2, wherein the signaling excludes residual information.
16. The method of solution 1 or 2, wherein the ZU block has residuals and a transform or an inverse-transform operation was not performed on the ZU block.
17. The method of solution 1 or 2, wherein a residual in the ZU block is coded with a transform-skip mode.
18. The method of solution 1 or 2, wherein the signaling excludes a transform skip flag.
19. The method of solution 1 or 2, wherein the ZU block is a coding unit (CU) split in an asymmetric binary-tree (ABT) partitioning.
20. The method of solution 1 or 2, wherein the ZU block is a block at a border of a picture, slice or tile.
21. The method of solution 1 or 2, wherein each coding unit at a border of a picture, slice, or tile is a ZU block.
22. The method of solution 19, wherein signaling includes a flag distinguishing between the CU and ZU block.
23. The method of solution 1 or 2, wherein the signaling comprises a maximum or minimum value for at least one of the dimensions of the ZU block.
24. The method of solution 23, wherein the signaling is in a Video Parameter Set (VPS), a Sequence Parameter Set (SPS), a Picture Parameter Set (PPS), a slice header, a coding tree unit (CTU) or a coding unit (CU).
25. The method of solution 1 or 2, wherein the ZU block may only be an inter-coded block.
26. The method of solution 25, wherein the ZU block may only be used in a P/B-picture/slice.
27. The method of solution 25, wherein the signaling excludes a prediction mode flag.
28. The method of solution 25, wherein the ZU block is implemented in conjunction with geometric partitioning.
29. The method of solution 28, wherein the geometric partitioning includes partitioning based on a shape of a parent partitioning.
30. The method of solution 28, wherein the geometric partitioning includes using only a merge mode.
31. The method of solution 28, wherein the signaling includes a flag indicating one of a merge mode or a regular AMVP mode for sub motion partitioning.
32. The method of solution 25, wherein the ZU block is predicted using a 2×2 ATMVP mode.
33. The method of solution 25, wherein the ZU block is predicted using a 2×2 affine mode.

Examples 1-7, described above, provide additional features and variations of solutions 1 to 33.

34. A method for video encoding, comprising: determining that a block of video data is a zero unit (ZU) block based on dimensions of the block being a power-of-two numbers; coding, upon deciding that this is a ZU block, the block of video data in a bitstream; and signaling the ZU block in the bitstream.
35. A method of video decoding, comprising: receiving a bitstream corresponding to a block of video data; determining that the block of video data is a zero-unit (ZU) block based on dimensions of the block being power-of-two numbers; and decoding, based on the signaling, the bitstream to reconstruct the block of video data.
36. The method of solution 34 or 35, wherein a transform operation or an inverse-transform operation is not performed on the ZU block.
37. The method of solution 34 or 35, wherein a quantization operation or de-quantization operation is not performed on the ZU block.
38. The method of any of solutions 34 to 37, wherein the determining further includes determining that the block of video data is the ZU block due to a total number of samples of the block of video data being greater than or equal to a threshold number T.
39. The method of any of solutions 34 to 37, wherein the determining further includes determining that the block of video data is the ZU block due to the dimensions further being greater than a first threshold for width or a second threshold for height of the block of video data.

Example 8, described above, provide additional features and variations of solutions 34 to 39.

40. A method for video encoding, comprising: determining that a block of video data having a width and a height is to be coded as a zero unit (ZU) block based on having a width less than or equal to a first integer and having a height less or equal to a second integer, coding, upon deciding that this is a ZU block, the block of video data as a ZU block; and signaling the ZU block in a bitstream.
41. A method of video decoding, comprising: receiving a bitstream corresponding to a block of video data having a width and a height; determining that the block of video data is to be decoded as a zero unit (ZU) block based on having a width greater than or equal to a first integer and having a height greater than or equal to a second integer; and decoding, based on the signaling, the bitstream to reconstruct the block of video data.

42. The method of solution 40 or 41, wherein the first integer and the second integer is one of 128 or 256.

43. A method for video encoding, comprising: determining that a block of video data having a width and a height is to be coded as a zero unit (ZU) block based on having a width greater than or equal to a first integer or having a height greater than or equal to a second integer, coding, upon deciding that this is a ZU block, the block of video data as a ZU block; and signaling the ZU block in a bitstream.

44. A method of video decoding, comprising: receiving a bitstream corresponding to a block of video data having a width and a height; determining that the block of video data is to be decoded as a zero unit (ZU) block based on having a width greater than or equal to a first integer or having a height greater or equal to a second integer; and decoding, based on the signaling, the bitstream to reconstruct the block of video data.

45. The method of solution 43 or 44, wherein the first integer and the second integer is one of 128 or 256.

46. A method for video encoding, comprising: determining that a block of video data having a width and a height is to be coded as a zero unit (ZU) block based on having the product of the width and the height greater than or equal to an integer, coding, upon deciding that this is a ZU block, the block of video data as a ZU block; and signaling the ZU block in a bitstream.

47. A method of video decoding, comprising: receiving a bitstream corresponding to a block of video data having a width and a height; determining that the block of video data is to be decoded as a zero unit (ZU) block based on having the product of the width and the height greater than or equal to an integer; and decoding, based on the signaling, the bitstream to reconstruct the block of video data.

48. The method of solution 46 or 47, wherein the integer is one of 16384 or 65536.

Examples 1-8, described above, provide additional features and variations of solutions 40-48.

49. An apparatus in a video system comprising a processor and a non-transitory memory with instructions thereon, wherein the instructions upon execution by the processor, cause the processor to implement the method in any one of solutions 1 to 48.

50. A computer program product stored on a non-transitory computer readable media, the computer program product including program code for carrying out the method in any one of solutions 1 to 48.

51. A method, apparatus or system described in the present document.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video, comprising:
   determining, for a conversion between a block of the video and a bitstream of the video, that the block is a zero-unit (ZU) block based on at least one dimension being a non-power-of-two number, wherein no transform or inverse-transform operations are performed on the ZU block; and
   performing the conversion based on the determining,
   wherein, in response to the block being the ZU block, all residuals of the block are set to zero;
   wherein signaling for an encoded ZU block in the bitstream excludes any syntax element indicating a prediction mode;
   wherein the signaling for the encoded ZU block does not include a cbf_flag and the cbf_flag of the ZU block is inferred to be zero, or
   the signaling for the encoded ZU block excludes a transform skip flag; and
   wherein motion information of the ZU block is inherited from motion information of a neighboring block.

2. The method of claim 1, wherein any one of the dimensions of the block is an even number of form 2N, where N is an integer.

3. The method of claim 1, wherein any one of the dimensions of the block is of form $2K^N$ where K is an integer.

4. The method of claim 1, wherein a transform operation or an inverse-transform operation is not performed on the ZU block.

5. The method of claim 1, wherein the ZU block is a coding unit (CU) split in an asymmetric binary-tree (ABT) partitioning.

6. The method of claim 1, wherein the ZU block is a block at a border of a picture, slice or tile.

7. The method of claim 1, wherein each coding unit at a border of a picture, slice, or tile is a ZU block.

8. The method of claim 1, wherein the ZU block may only be an inter-coded block.

9. The method of claim 1, wherein the determining further includes determining that the block is the ZU block due to a total number of samples of the block being greater than or equal to a threshold number T.

10. The method of claim 1, wherein the determining further includes determining that the block is the ZU block due to the dimensions further being greater than a first threshold for width or a second threshold for height of the block of the video.

11. The method of claim 1, wherein the conversion includes decoding the block from the bitstream.

12. The method of claim 1, wherein the conversion includes encoding the block into the bitstream.

13. An apparatus for processing video comprising a processor and a non-transitory memory with instructions thereon, wherein the instructions upon execution by the processor, cause the processor to:
    determine, for a conversion between a block of a video and a bitstream of the video, that the block is a zero-unit (ZU) block based on at least one dimension being a non-power-of-two number, wherein no transform or inverse-transform operations are performed on the ZU block; and
    perform the conversion based on the determination,
    wherein, in response to the block being the ZU block, all residuals of the block are set to zero;
    wherein signaling for an encoded ZU block in the bitstream excludes any syntax element indicating a prediction mode; and
    wherein the signaling for the encoded ZU block does not include a cbf_flag and the cbf_flag of the ZU block is inferred to be zero, or
    the signaling for the encoded ZU block excludes a transform skip flag; and
    wherein motion information of the ZU block is inherited from motion information of a neighboring block.

14. The apparatus of claim 13, wherein any one of the dimensions of the block is an even number of form 2N, where N is an integer.

15. A non-transitory computer-readable storage medium storing instructions that cause a processor to:
    determine, for a conversion between a block of video and a bitstream of the video, that the block is a zero-unit (ZU) block based on at least one dimension being a non-power-of-two number, wherein no transform or inverse-transform operations are performed on the ZU block; and
    perform the conversion based on the determination,
    wherein, in response to the block being the ZU block, all residuals of the block are set to zero;
    wherein signaling for an encoded ZU block in the bitstream excludes any syntax element indicating a prediction mode; and
    wherein the signaling for the encoded ZU block does not include a cbf_flag and the cbf_flag of the ZU block is inferred to be zero, or
    wherein the signaling for the encoded ZU block excludes a transform skip flag; and
    wherein motion information of the ZU block is inherited from motion information of a neighboring block.

16. The apparatus of claim 13, wherein any one of the dimensions of the block is of form $2K^N$ where K is an integer.

17. The apparatus of claim 13, wherein a transform operation or an inverse-transform operation is not performed on the ZU block.

18. The non-transitory computer-readable storage medium of claim 15, wherein any one of the dimensions of the block is an even number of form 2N, where N is an integer.

19. A non-transitory computer-readable recording medium storing a bitstream of a video which is generated by a method performed by a video processing apparatus, wherein the method comprises:
- determining, for a conversion between a block of the video and the bitstream, that the block is a zero-unit (ZU) block based on at least one dimension being a non-power-of-two number, wherein no transform or inverse-transform operations are performed on the ZU block; and
- generating the bitstream from the block based on the determining,
- wherein, in response to the block being the ZU block, all residuals of the block are set to zero;
- wherein signaling for an encoded ZU block in the bitstream excludes any syntax element indicating a prediction mode; and
- wherein the signaling for the encoded ZU block does not include a cbf_flag and the cbf_flag of the ZU block is inferred to be zero, or
- wherein the signaling for the encoded ZU block excludes a transform skip flag; and
- wherein motion information of the ZU block is inherited from motion information of a neighboring block.

* * * * *